US009482754B2

United States Patent
Nakahata et al.

(10) Patent No.: US 9,482,754 B2
(45) Date of Patent: Nov. 1, 2016

(54) DETECTION APPARATUS, DETECTION METHOD AND MANIPULATOR

(71) Applicant: Kikai Sekkei Nakahata Kabushiki Kaisha, Tochigi (JP)

(72) Inventors: Mitsuaki Nakahata, Tochigi (JP); Hiroshi Nakahata, Tochigi (JP)

(73) Assignee: KIKAI SEKKEI NAKAHATA KABUSHIKI KAISHA, Tochigi (JP)

( * ) Notice: Subject to any disclaimer, the term of this patent is extended or adjusted under 35 U.S.C. 154(b) by 73 days.

(21) Appl. No.: 14/569,954

(22) Filed: Dec. 15, 2014

(65) Prior Publication Data

US 2015/0316648 A1 Nov. 5, 2015

(30) Foreign Application Priority Data

May 1, 2014 (JP) ................................. 2014-094540

(51) Int. Cl.
*G01C 3/08* (2006.01)
*G01S 17/06* (2006.01)
*G01S 7/481* (2006.01)
*B25J 19/02* (2006.01)
*G01B 11/00* (2006.01)
*G01B 11/24* (2006.01)

(52) U.S. Cl.
CPC .............. *G01S 17/06* (2013.01); *B25J 19/021* (2013.01); *G01B 11/002* (2013.01); *G01B 11/24* (2013.01); *G01S 7/4813* (2013.01)

(58) Field of Classification Search
CPC ..... G01S 17/06; G01B 11/002; B25J 19/021
USPC ....................................................... 356/3.11
See application file for complete search history.

(56) References Cited

U.S. PATENT DOCUMENTS 6,618,496 B1 * 9/2003 Tassakos ................ B25J 19/021
382/152
7,962,303 B2 * 6/2011 Oue ....................... B62D 65/005
702/167

FOREIGN PATENT DOCUMENTS

| JP | 04268404 | | 9/1992 |
| JP | 08328624 | A | 12/1996 |
| JP | 2011257267 | A | 12/2011 |

OTHER PUBLICATIONS

Office Action for corresponding JP Application No. 2014-094540, dated Sep. 9, 2014.
Office Action for corresponding JP Application No. 2014-094540, dated Feb. 10, 2015.

* cited by examiner

*Primary Examiner* — Mark Hellner
(74) *Attorney, Agent, or Firm* — Matthew B. Dernier, Esq.

(57) ABSTRACT

A detection unit comprising a manipulator, a imaging unit, a light beam irradiation unit and a computing unit, the imaging unit and the light beam irradiation unit are provided on a manipulator. The detection apparatus includes a horizontal imaging plane, which includes an optical axis of the imaging unit, and a vertical imaging plane, which includes the optical axis of the imaging unit and 1) a projection of a light beam from the light beam irradiation unit on the horizontal imaging plane and 2) a projection of a light beam from the light beam irradiation unit on the vertical imaging plane respectively form an intersecting angle with the optical axis of the imaging unit.

12 Claims, 13 Drawing Sheets

DETECTION APPARATUS, DETECTION METHOD AND MANIPULATOR

BACKGROUND OF THE INVENTION

1. Field of the Invention

The present invention relates to a detection apparatus and a method to control an operation of a manipulator comprising the detection apparatus in real time, the detection apparatus comprising of a single light beam irradiation device and a single monocular imaging camera mounted to a manipulator of a robot and the like, and the detection apparatus detecting a three-dimensional position of an object imaged by the camera.

2. Description of the Related Art

In recent years, it is becoming popular to use images imaged by a video camera and the like for a work of robot. Through the use of the imaged images, work object is identified or position and posture information of the work object are obtained to control operation of the robot.

It is, however, general to use a compound eye camera to obtain the three-dimensional position of the object. Camera is sometimes mounted around a robot hand. However, most of the times, camera is mounted external to the robot, mounted on a robot main body or mounted on a robot head.

Images imaged by monocular camera can be made to pseudo three-dimensional images. This is realized by selecting and fixing a perspective frame to give depth to the images. Also, as long as a distance from a camera to an objective plane is known, even an image from front can be made to a three-dimensional image. By processing such images, work such as fast picking is performed.

An industrial robot is intended to enhance productivity. To this end, the industrial robot is imposed to improve operating speed and to accurately repeat operation. To make the robot work, it is necessary to deliver and receive the work object in a fixed manner. However, it is sometimes difficult, due to increasing costs, to machinery prepare position and posture of the object to deliver the robot. In this case, information such as the posture and position of the object are obtained through the use of the imaged images to solve the problem.

Images imaged by the video camera are sequential images. In the prior described above, however, perform operation control of robot by segmenting one of the sequential images. This does not make good use of a temporal change, which is a feature of the continuous image.

The temporal change of the sequential images relates to a quality of work of robot, including detecting pickup failure of the work object or monitoring work completion. The industrial robot should solve these problems in the future.

Some complicated processes are required and a considerable analysis time (about 0.4 seconds) is taken to obtain the three-dimensional information from two-dimensional imaged image when the compound eye camera is used. This is why one of the continuous image is used. Through the use of the monocular camera, however, three-dimensional information is obtained by fixing imaging frame (camera) and recognizing distance from a camera to an objective photographed plane.

When the compound eye camera is used, there is a flexibility in the imaging frame though, it takes time for processing. On the other hand, when the monocular camera is used, the imaging frame is fixed but it takes less time for processing. This relates to time for detecting distance to the objective photographed plane.

Japanese Patent Application Laid-Open No. 2011-257267 discloses a method for detecting a distance from the objective photographed plane to a focal of the camera and a direction of the objective photographed plane in real time. The distance and the direction are detected through the use of the monocular camera mounted to the hand and three light beams. It is, however, difficult to detect arrangement of devices and adjust the arrangement so as to apply a mathematical expression. Further, detection of the work object and operation control of the hand are problems to be solved in the future.

SUMMARY OF THE INVENTION

According to an aspect of the present disclosure, in a detection apparatus to be connected to an imaging unit, the imaging unit is provided on a manipulator having a light beam irradiation unit, wherein a horizontal imaging plane is defined as a plane including both of an optical axis of the imaging unit and a horizontal x axis defined in an imaging plane of the imaging unit, and a vertical plane is defined as a plane including both of the optical axis and a vertical y axis defined in the imaging plane, and wherein 1) a projection, on the horizontal imaging plane, of a light beam from the light beam irradiation unit and 2) a projection, on the vertical imaging plane, of a light beam from the light beam irradiation unit respectively form an intersecting angle with the optical axis of the imaging unit, comprising: a computing unit configured to compute a distance L between the light beam irradiation unit and an objective photographed plane which is orthogonal to a light beam irradiation direction, by obtaining a position of a light beam irradiation point on the imaging plane of the objective photographed plane from an image, which is imaged by the imaging unit, of a light beam irradiation point on the objective photographed plane defined on the object, wherein the computing unit is configured to obtain a corresponding distance L for the obtained position of the light beam irradiation point on the imaging plane with reference to a relational expression previously formed based on: 3) a position $(x_i, y_i)$ $(i=0, 1, 2, \ldots N)$ of the light beam irradiation points on the imaging plane; and 4) an actually measured value of distances $L_i$ between the an objective photographed plane and light beam irradiation unit for respective position $(x_i, y_i)$ of the light beam irradiation points on the imaging plane, wherein the computing unit is configured to detect a three-dimensional position of the imaged object based on the obtained corresponding distance L.

According to another aspect of the present disclosure, a method for defining work object projected on the an objective photographed plane or the reference an objective photographed plane comprising: restructuring the object with elements extracted by luminance differences in a rectangular area of the imaged image including the object; defining a first profile data by dividing a periphery of an element group into equal angles, the first profile data is a shape data having an angle and size or radius; for unitizing, calculating a sum of squares of radii [e.g., $sumr\theta j = \Sigma (x_{ai}^2 + y_{ai}^2)(i=1$ to $N\theta j$, $\theta = j)$ in the following embodiment] from a center of figure of luminance difference elements, and dividing the square root of the sum of squares of radii of elements [$r\theta pj = \sqrt{(sumr\theta j)}/\Sigma(\sqrt{sumr\theta j})$ in the following embodiment]; and defining a profile based on a distance from the apparatus mounting base plane when imaged to the light beam irradiation point, threshold of luminance difference, longitudinal and lateral sizes of luminance difference element group, position of center of figure, and number of luminance difference elements.

According to another aspect of the present disclosure, a method for detecting the work object in the imaged image comprising: calculating the distance from the apparatus mounting base plane to the light beam irradiation point using the detection unit according to the disclosure, selecting the profile and the first profile data of closest distance among the profiles of registered object based on the distance, determining a size of a search unit by performing distance interpolation or extrapolation of longitudinal and lateral size of the registered profile, and selecting a search unit having minimum total sum of absolute difference with the registered first profile data as selected among the first profile data generated in the search unit disposed on an entire image screen, wherein, by defining the center of the object as the center of figure of the luminance difference element group of the search unit, point on the imaging plane is specified, and the position of the center of object having the light beam irradiation point as origin is determined based on the direction component on the an objective photographed plane as defined by the operation direction of the manipulator and the light beam irradiation direction component using the detection unit of the present disclosure.

According to another aspect of the present disclosure, an operation control method for operating, by a robot controller, a manipulator in real time, wherein the detection unit according to claim 1, 2, or 3 is provided at the end of the manipulator, and wherein a computing device and a robot controller are connected by LAN, comprising: outputting an instruction to set and search the work object from the robot controller to the computing device through communication, selecting, by the computing device, the profile of the work object and the registered first profile data to detect the position of the work object from the imaged image according to the method as described in claim 6, and returning, by the computing device, distance from the apparatus mounting base plane to the work object, position on the an objective photographed plane and direction of the object to the robot controller.

According to another aspect of the present disclosure, a method to detect difference between the object in the imaged image and the registered object, the method comprising: calculating total sum of absolute difference with the area-fixed profile data generated by the imaged image and the area-fixed profile data as registered to digitalize changes in the rectangular area, which is realized by fixing the rectangular area which extracts the luminance difference element used for generating the registered profile data of the work object, and fixing center of figure of the registered profile as center of figure of the luminance difference element extracted from the imaged image, and detecting matters relating to determine whether work quality is acceptable or not, the work quality including work quality condition before the work, progress of the work, end of the work, and existence or non-existing of a work failure.

According to another aspect of the present disclosure, an operation control method in which the total sum of absolute difference with the area-fixed profile data indicates amount of change of the object in the rectangular area, comprising: detecting a position to control driving force of an end effector by defining the amount of change of the object as amount of change of the position of the object, and performing a work by a robot controller by controlling power.

Further features of the present invention will become apparent from the following description of exemplary embodiments with reference to the attached drawings.

DESCRIPTION OF THE EMBODIMENTS

Figure 1:
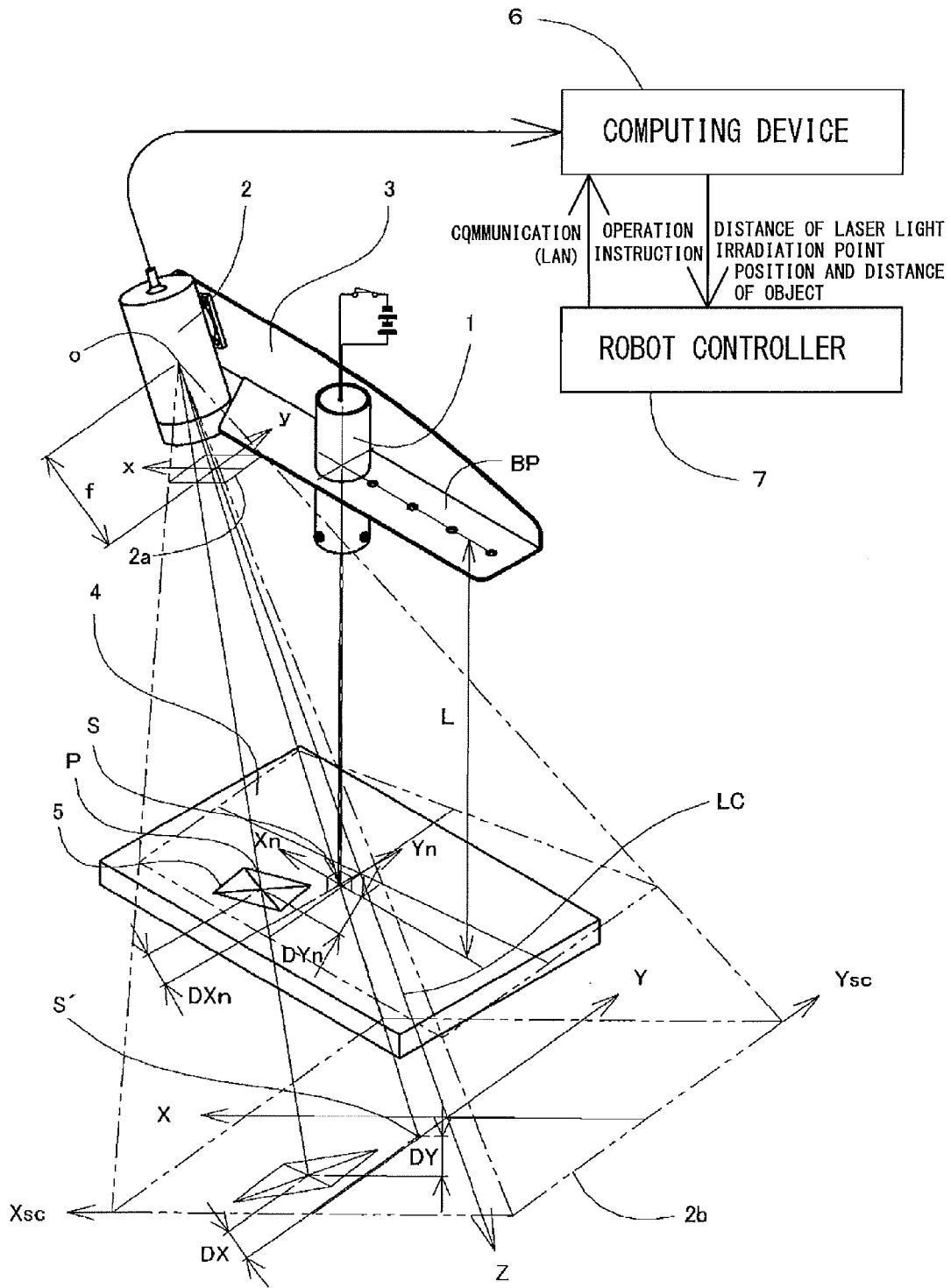
FIG. 1 is a configuration diagram of an optical system viewed obliquely from front, in which configuration of three-dimensional position detection apparatus for detecting the three-dimensional position of object is shown.

Now, embodiments of the present disclosure are described.

In the description, a monocular camera mounted to a manipulator and a light beam which forms an angle with an optical axis of the camera are used. A distance from an irradiation point to an apparatus mounting base plane is calculated based on a position of a light beam irradiation point of an imaging plane.

Coordinates of an imaging plane of the light beam irradiation point group and distances from the apparatus base plane to the light beam irradiation point t group are previously measured. A straight line connecting the light beam irradiation point group on a virtual imaging plane is taken in a virtual imaging space as the light beam, the virtual imaging space shaped in quadrangular pyramid.

The light beam irradiation point and the irradiation direction are identified to generate an expression expressing an objective photographed plane which includes the light beam irradiation point and which is orthogonal to the light beam is generated. A position of the imaging point projected to the objective photographed plane is obtained by calculating the expression.

The light beam irradiation point is the imaging point on one straight line on the imaging plane which relates to the distance to the apparatus mounting base plane. The light beam irradiation point is easy to detect. Through the use of an approximate expression, the distance can be calculated at high speed, which realizes image processing in real time.

The work object is made into profile data. This is realized by extracting the luminance difference element featured by the luminance difference of the imaged image; defining profile by the luminance difference element; dividing periphery of a center of figure of element group into equal angles; and unitizing a square root of sum of squares of radii of element in an angle zone (sumrθj) divided by the sum of all angle zone (Σsumrθj).

The profile data is formed by compressing an original image data. The profile data allows easily performing real time processing. Also, by utilizing the luminance difference, the profile data is not easily influenced by an illuminance of an environment. To obtain the luminance difference of the light beam irradiation point, it is sometimes desirable that the luminance of the environment is low. The work object is searched as follows.

First, a search unit is formed by dividing the entire imaged image and recombining the divided imaged images. Then, the profile data is created. The profile data is compared with profile data of the work object to be searched which is previously created and registered. The profile data having minimum difference and within an allowable value in all search units is selected. As above, the work object is searched. The position of the work object is set to be a center of profile of the search unit.

Note that the direction (rotation) of the work object is defined by an angle having minimum difference of an absolute angle obtained by moving the profile data of the registered work object and comparing the profile data of the registered work object with the work object. Its precision is limited if real time processing is taken priority because the size of the divided angle has an inverse relationship with calculation speed.

By matching the center of profile of the searched work object (center of figure) as searched with the position of the imaging point on imaging plane, a plane position from the light beam irradiation point is calculated so that three-dimensional position of the work object is obtained.

In one embodiment, a manipulator includes a camera, such as a monocular camera and a light beam irradiation device mounted to the manipulator. The computing device may display image or result obtained by the computing processing (creating profile data of the work object, searching the work object including management; calculating the three-dimensional position).

An operation of the manipulator comprising the apparatus may be performed by a robot controller. The robot controller may intercommunicate with the computing device of the detection apparatus through any type of connection, e.g., LAN connection, wireless communication etc. In one embodiment, the robot controller may be master and the computing device of the detection apparatus may be subordinate.

The work object is set by the robot controller. Then, a search instruction is given to the computing device of the present detection apparatus through communication. The computing device having received the instruction analyzes the imaged image. Then, the computing device returns the distance from the light beam irradiation point to the apparatus mounting base plane, the plane position of the center of the work object which has the light beam irradiation point as an origin, and the direction of the object to the robot controller.

The robot controller calculates relation of the three-dimensional position of the work object as returned and action points of the end effector and the like to control the operation of the manipulator.

The three-dimensional position of the work object can be updated in real time (about 100 msec). This enables the robot controller to operate the manipulator while feeding back a situation. The imaging camera of the present apparatus is mounted to the moving manipulator. To take image which is capable of applying to the analysis, the image should be taken at a speed allowing to image clearly or the image should be taken in a stationary state.

When the robot performs work, it sometimes approaches the work object at a low speed so that this opportunity may be utilized. Alternatively, such opportunity to take image needs to intentionally be made.

The present invention converts the two-dimensional image imaged by the monocular camera into the three-dimensional image. This is realized by adding the light beam irradiation. The image of the work object is then compressed into the profile data. Due to this, a system which can simply and inexpensively analyze the three-dimensional image in real time is provided.

Conventionally, in the industrial robot, the image analyzing system is used by fixing the imaging camera (by mounting the imaging camera external to or main body of the robot) or by semi-fixing (by mounting the camera to the robot head which turns or swings). The imaging camera of the present invention, however, is a novel detection apparatus in which the imaging camera is mounted to the moving manipulator and the distance to the work object, position or direction (rotation) of the work object can be detected in real time.

By applying the detection apparatus of the present invention to the operation of the robot, a new work form of the robot can be provided, in which relative distance (or position) of the manipulator and the work object is measured, and the direction is detected while applying the end effector to the object.

This is common in a process of robot teaching. It is considered that this contributes to saving work and certainty of work which now require much work. Also, it is considered that utilizing the temporal change of sequential images contributes to resolving uncertainty caused at the end effector which was, conventionally, difficult to cope with.

Figure 2:
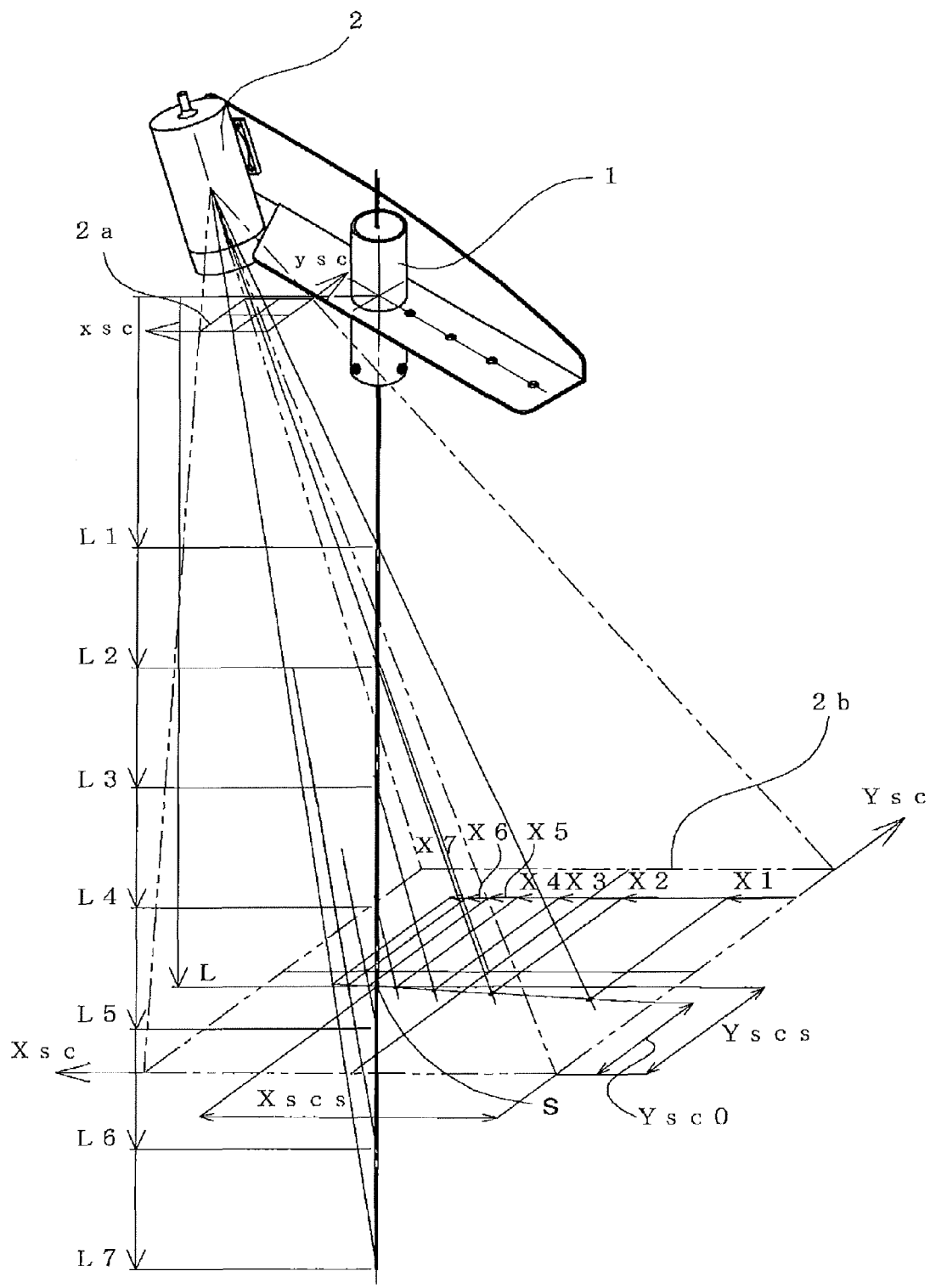
FIG. 2 is a diagram which geometrically explains position of light beam irradiation point photographed on a virtual imaging plane and a distance from a detection apparatus mounting base plane to a light beam irradiation point.
Figure 3A:
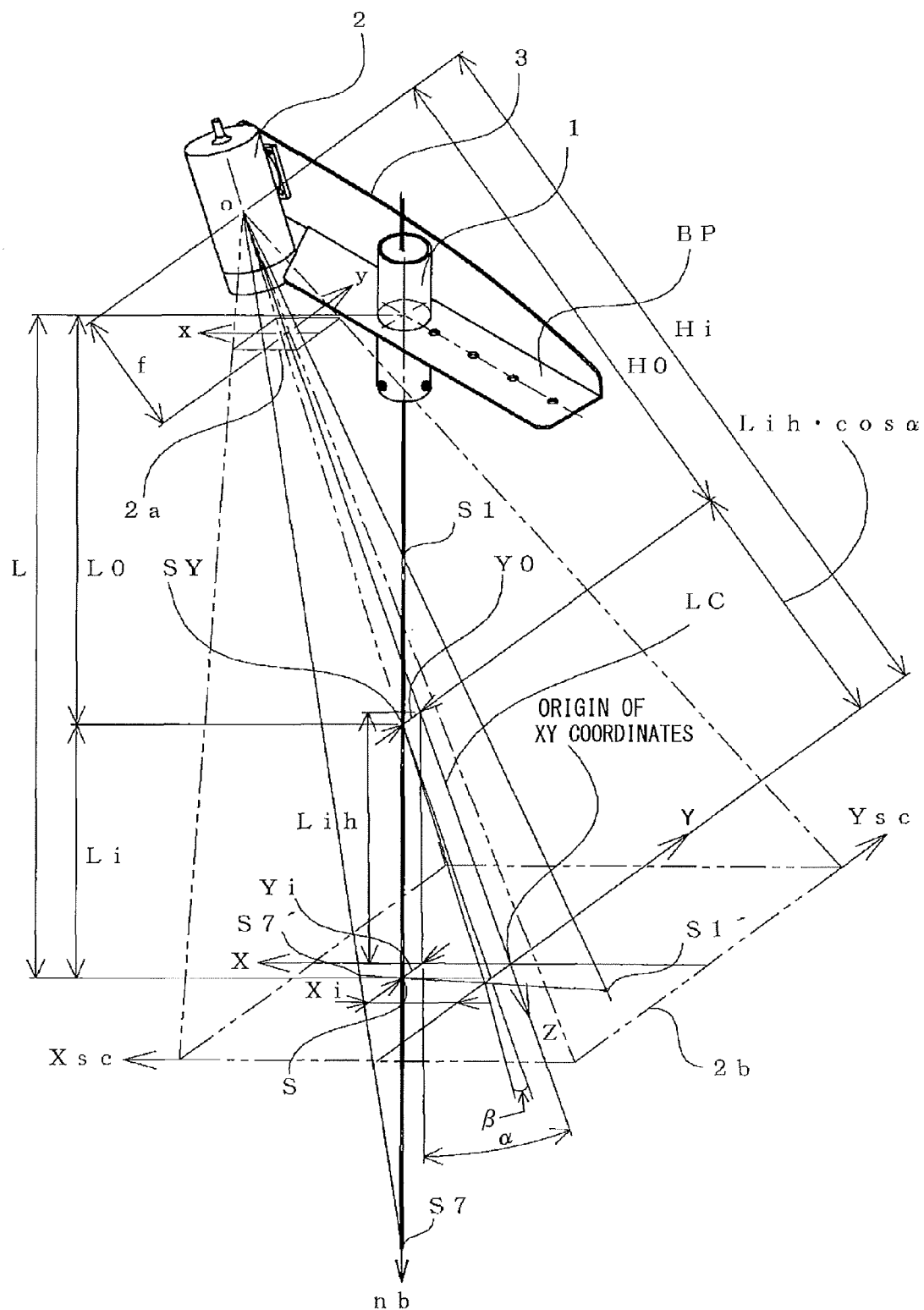
FIG. 3A is a diagram showing geometry of imaging plane, virtual imaging plane and light beam irradiation point (spot S) on the objective photographed plane to explain established expression.
Figure 3B:
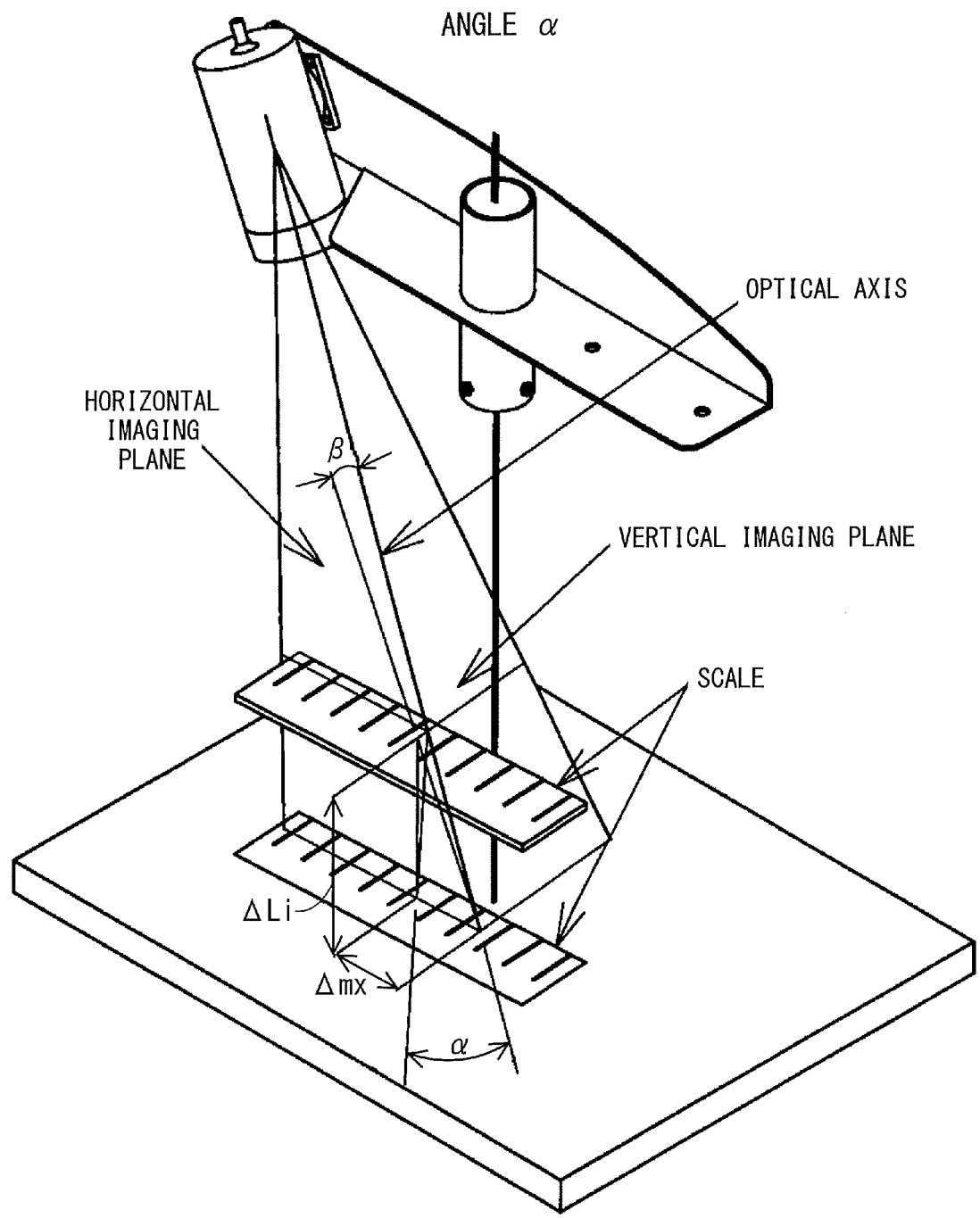
FIGS. 3B and 3C are diagrams for illustrating an angle $\alpha$ and an angle $\beta$ in relation with scales and $\Delta Li$.
Figure 3C:
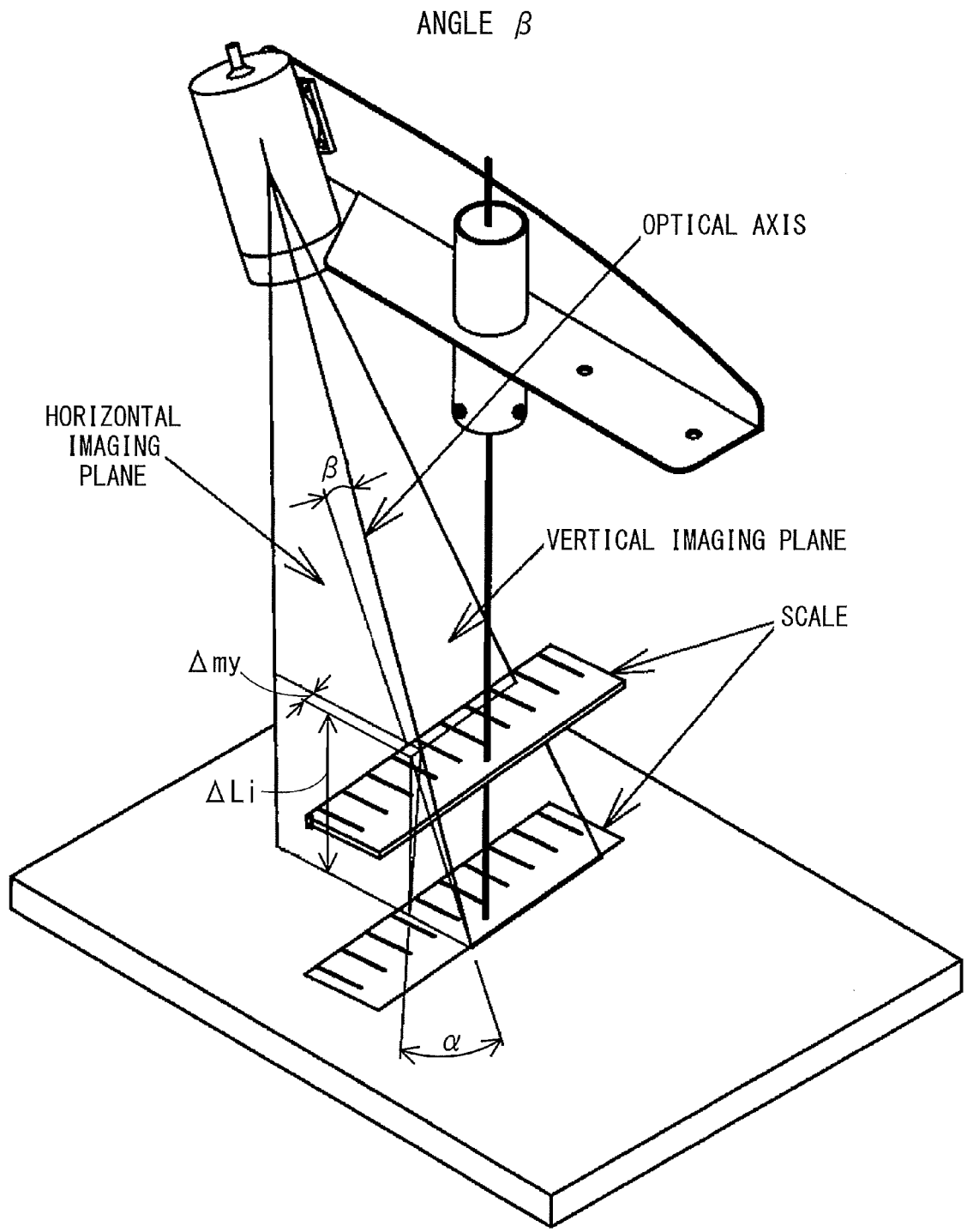
Figure 3D:
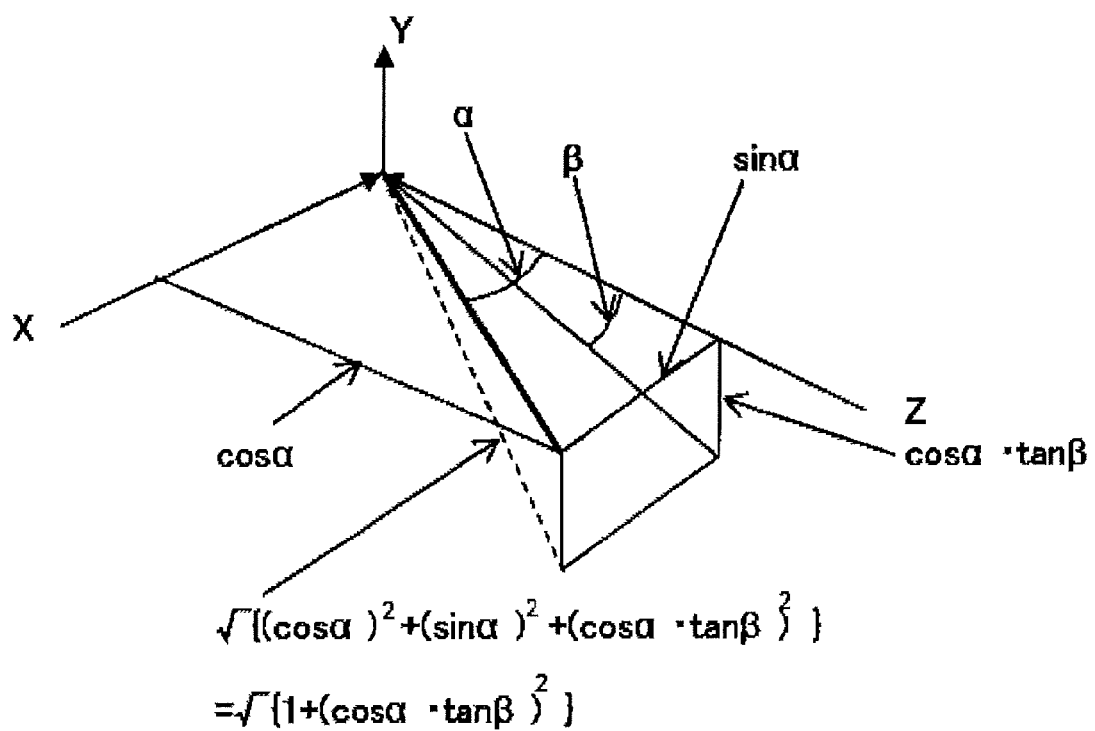
FIG. 3D is a diagram for illustrating a relation among $f\beta$, an angle $\alpha$ and an angle $\beta$.

The uncertainty includes whether the object is successfully held or not by monitoring the relative position of the end effector and the work object, whether the alignment of the object is good or not by comparing the difference with the reference image of the object and the degree or condition of the work progress by detecting the progress of the difference. Embodiment for carrying out the invention will be described based on the drawings. FIG. 1 is a configuration diagram of an optical system viewed obliquely from front, in which configuration of a manipulator including three-dimensional position detection apparatus for detecting the three-dimensional position of object is shown. FIG. 2 is a diagram showing position of light beam irradiation point photographed on a virtual imaging plane and distance from a detection apparatus mounting base plane to a light beam irradiation point. FIG. 3A is a diagram showing geometry of imaging plane, virtual imaging plane and light beam irradiation point to explain established expression. FIGS. 3B and 3C are diagrams for illustrating an angle α and an angle β in relation with scales and ΔLi. FIG. 3D is a diagram for illustrating a relation among fβ, an angle α and an angle β.

Figure 4:
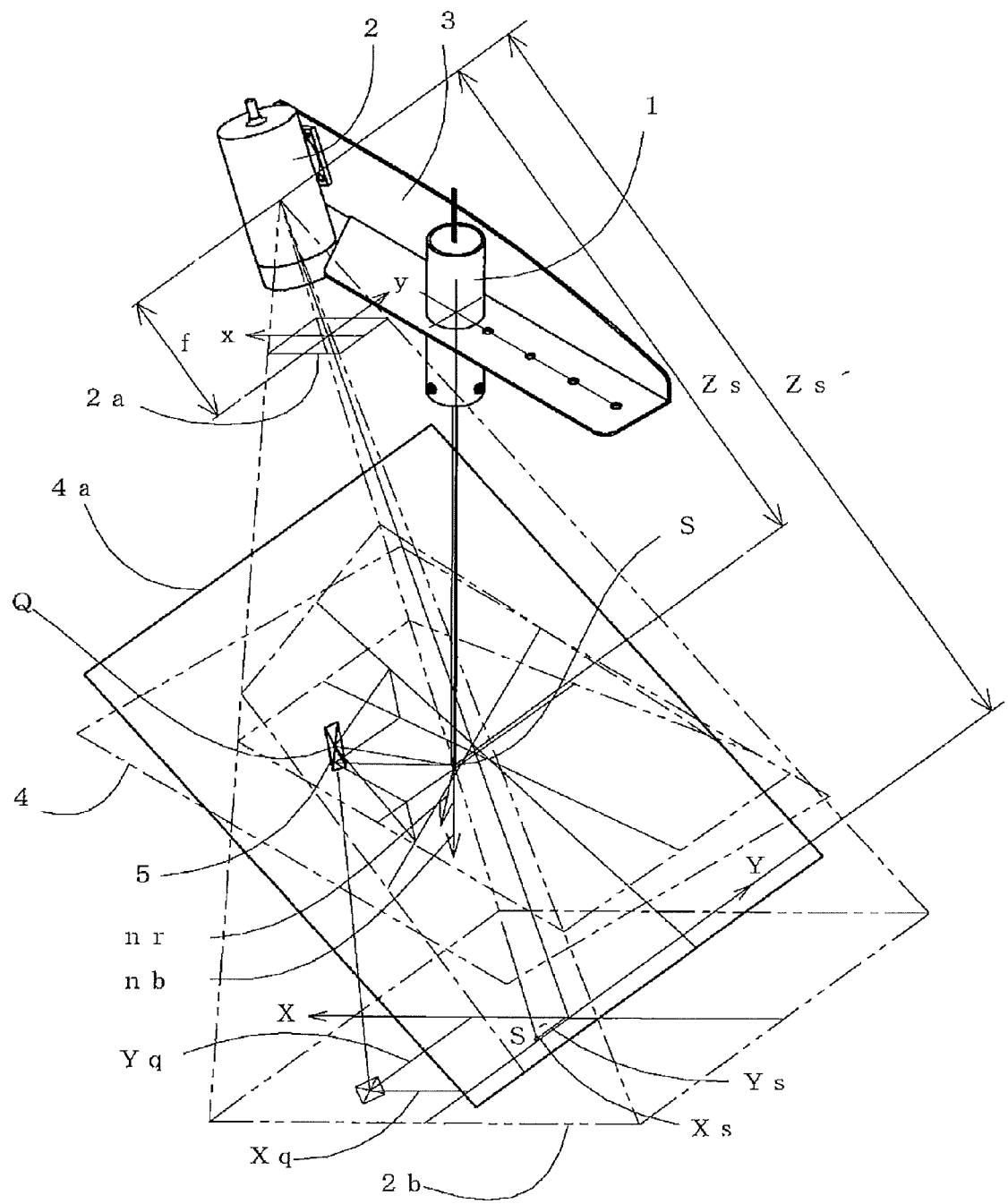
FIG. 4 is a diagram for geometrically showing mathematical processing by which position of center of figure of object on reference photographed plane is projected to orthogonal plane of light beam.

FIG. 4 is a diagram for geometrically showing mathematical processing by which position of center of figure of object on reference photographed plane is projected on orthogonal surface of light beam. Note that light beam irradiation point S' on a virtual imaging plane 2b in FIGS. 1 and 4 originally matches with light beam irradiation point S on the objective photographed plane. These points, however, are intentionally separated for better understanding.

Figure 9:
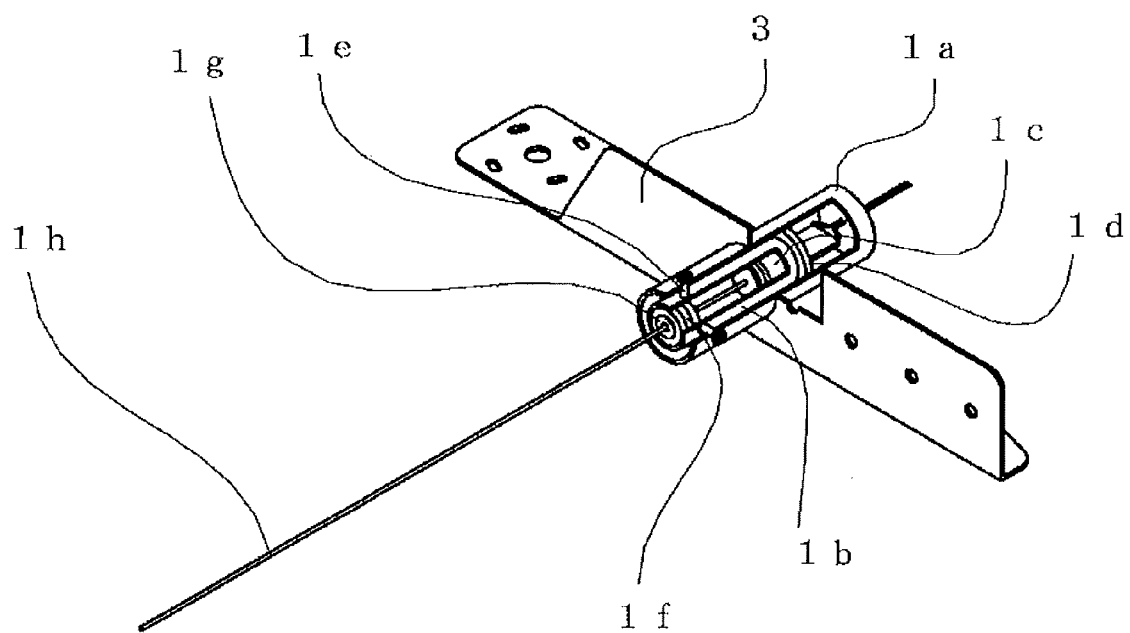
FIG. 9 shows an example of perspective cross sectional structure of light beam irradiation device, which is a principle of the present invention.

The manipulator in FIGS. 1 and 3A is comprised of a light beam irradiation device 1 and an imaging camera 2 which are fixed by a frame 3. When a light beam irradiated from the light beam irradiation device 1 is projected on a horizontal imaging plane defined by X-axis and an optical axis LC (also shown as Z axis, which is perpendicular to X axis and Y axis, in FIGS. 1 and 3A) of the imaging camera, an angle α is formed by the projected light beam and the optical axis LC. When the light beam irradiated from the light beam irradiation device 1 is projected on a vertical imaging plane defined by Y-axis and the optical axis LC, an angle β is formed by the projected light beam and the optical axis LC, as shown in FIGS. 3B and 3C. It is, however, not necessary that the light beam directly intersects the optical axis LC of the imaging camera. An intersection of an objective photographed plane 4 of the imaging camera and the light beam is indicated by a light beam irradiation point S. The distance from the objective photographed plane 4 of the imaging camera to the detection apparatus mounting base plane BP is defined by L, which is orthogonal to the light beam irradiation direction vector. A computing device 6 comprises some main functions as follows. An image of the work object 5 is projected on the objective photographed plane 4, which is compressed into a profile data. From coordinates of center of figure of luminance difference element group of an imaging plane 2a, coordinates of a virtual imaging plane 2b of the camera is calculated. Based on the coordinates (Xi, Yi) of the virtual imaging plane 2b of the camera of the light beam irradiation point, a plane position (DXn, DYn) of the center of the work object, with the light beam irradiation point on the objective photographed plane as origin (0,0) is calculated. The computing device 6 receives output instruction from a robot controller 7 through communication. Then, the computing device 6 outputs the three-dimensional position information and a direction θ of the work object to the robot controller through communication. FIG. 9 shows an embodiment of the light beam irradiation device 1. The light beam irradiation device 1 is comprised of a light beam irradiation module 1c, an inner cylinder 1b, an outer cylinder 1a, an elastic holding member 1d, a light reducing plate 1f and a hold 1g. The light beam is generated by the light beam irradiation module 1c. For example, what is used for a laser pointer can be adapted to the light beam irradiation module. The light beam irradiation module 1c is fixedly provided on the inner-side of the inner cylinder 1b, which is supported by the elastic holding member 1d by the outer cylinder 1a fixed to the frame 3. The outer cylinder 1a comprises a direction adjustment bolt 1e capable of finely adjusting the light beam irradiation direction. The light reducing plate 1f, which is adapted to improve safety and protect the imaging plane from being burnt, is attached to the edge of the inner cylinder. The light reducing plate comprises the hole 1g for determining the size of the light beam.

It is desirable that the imaging camera 2 is a camera which uses a CCD imaging element and the like as the imaging plane 2a and is capable of inputting imaging signal to the computing device (for example, WEB camera connected by USB terminal) and has an auto focus function, which allows to clearly capture an object located close to or located away from the camera.

As the computing device 6, a microcomputer can be used. The microcomputer used as the computing device 6 has display (image display device), I/O interface for connecting to, such as USB terminals and the like, and is capable of communicating with external device. Also, the microcomputer performs computing processing at CPU (Central Processing Unit) while using RAM and the like for temporal storage based on program stored in a ROM and the like.

The robot controller 7 is a device adapted to operate a manipulator, which is usually attached to the manipulator. It is required that the robot controller 7 comprises a computing device and communication function for communicating with the computing device 6. Through the communication with the computing device 6, instruction is given, result is received and the received result is reflected to the operation.

FIG. 2 is a diagram which geometrically explains a mechanism for detecting distance from a light beam irradiation device mounting base plane BP to the objective photographed plane 4, which is a principle of the present invention. One quadrangular pyramid is formed by a focal point o and the imaging plane 2a of the imaging camera 2. The other quadrangular pyramid is formed by the focal point o and the virtual imaging plane 2b of the imaging camera 2. These quadrangular pyramids are in similarity relation. A distance from the detection apparatus mounting base plane BP of the light beam irradiation device 1 to the objective photographed plane 4 is represented by distance L. The light beam intersects the light beam irradiation point S on the objective photographed plane 4. Normally, the imaging plane 2a uses coordinates of pixel units of a fine rectangular imaging element, in which right and downward directions of the imaging screen are defined as xsc-axis and ysc-axis respectively, and left upper of the imaging screen is defined as origin (0, 0). The same is applied to the virtual imaging plane with an actual size of mm unit, in which right and downward directions of the virtual imaging plane are defined as xsc-axis and ysc-axis respectively. The coordinates of the light beam irradiation point S on the virtual imaging plane 2b are defined as (Xscs, Yscs). The coordinates of the light beam irradiation point S on the imaging plane 2a are defined as (xscs, yscs).

As an example, the distance of the light beam irradiation point is divided into equal intervals of L1 to L7. A straight line connecting each irradiation point and the focal point o of the imaging camera is expanded and contracted to generate a group of intersections with the virtual imaging plane 2b. The group of intersections is then arranged on one straight line. An expression for the straight line is defined as follows on the imaging plane 2a.

$$yscs = ysc0 + a0 * xscs$$

Here, the ysc0 represents a value of ysc-axis intercept of the straight line. The a0 represents constant representing an inclination of the straight line, indicating that the imaging camera turns around the optical axis by the angle $\tan^{-1} a0$ from the x-axis. The ysc0 and the a0 can be obtained using the image actually imaged.

The coordinates Xscs of the light beam irradiation point on the virtual imaging plane 2b relates to an angle α, which is formed by projecting a light beam with the light beam irradiation direction vector nb onto a horizontal imaging plane which is defined by the optical axis LC of the imaging camera and horizontal x-axis. The coordinate value xscs on the imaging plane of pixel unit and the distance L have a correlation of strong logarithmic relation. An approximate expression can be formed using the image actually imaged. An example of the approximate expression is given as follows.

$$L=10^{f(xscs)} \text{ where } f(xscs)=\Sigma bi*xscs^i \ (i=0 \text{ to } 4)$$

In one embodiment, when the distance L is from 100 to 500 mm, an approximate accuracy error is 0.86 mm at maximum and 0.26 mm in average. The higher-order approximate expression improves the accuracy.

The light beam irradiation direction is orthogonal to the detection apparatus mounting base plane BP. This is ensured by the fact that the position of the light beam irradiation point is immovable on a plane which moves parallel to the mounting base plane.

The distance L can be calculated as follows. The light beam irradiation point is searched, on the imaging plane 2a, on a straight line on which the light beam irradiation point can exist. When the light beam irradiation point is found, the coordinates (xscs, yscs) of the light beam irradiation point are obtained. The obtained coordinate value xscs is substituted in the approximate expression as above. Then, the distance L can be calculated. Note that, light irradiation point of a red light beam can steadily be found by setting threshold value for red luminance difference of right, left, up and down pixels and maximum luminance of a center pixel.

Here, as illustrated in FIG. 3, to derive a relational expression of the light beam irradiation point S, new coordinates intersecting the optical axis LC of the imaging camera are introduced to the imaging plane 2a, which are defined as xy coordinates of the imaging plane. The width and the height of the imaging plane respectively are defined as w pixel and h pixel. In this case, x-axis has following relation to the xsc-axis.

$$x=xsc-w/2$$

Also, y-axis has following relation to the ysc-axis.

$$y=ysc-h/2$$

Z-axis is defined as the optical axis direction of the camera. Based on the above, a height of a quadrangular pyramid comprising the imaging plane 2a is defined by a focal distance f pixel. The imaging plane is defined as follows.

$$z=f$$

Similarly, XY coordinates are introduced to the virtual imaging plane 2b, which is in similar relation with the imaging plane.

With reference to FIGS. 3B-3D, three valuables for featuring the light beam to a virtual imaging space (quadrangular pyramid) are introduced and defined as follows. The three valuables are angle α, angle β, and distance H0. The angle α is formed by a light beam projected straight line and the optical axis of the camera. The light beam projected straight line is obtained by projecting the light beam onto the horizontal imaging plane which includes the optical axis LC of the camera. The angle β is formed by a light beam projected straight line and the optical axis of the camera. The light beam projected straight line is obtained by projecting the light beam onto the vertical imaging plane which includes the optical axis LC of the camera. The distance (height) H0 is the distance from the vertical imaging plane including the optical axis of the camera to a focal point o of intersection SY of the light beam. Here, the light beam irradiation point S is located on the virtual imaging plane 2b.

The distance from the light beam irradiation point S to the detection apparatus mounting base plane BP is defined by L. The coordinates of the light beam irradiation point S are defined as (Xi, Yi). In the imaging space of the camera, a straight line, connecting z-axis intercept and x-axis intercept of the projected straight line of the light beam projected onto the horizontal plane, is defined as Lih. In this case, a straight line connecting the origin of the XY coordinates and z-axis intercept on the optical axis is defined as follows.

$$Lih*\cos \alpha$$

Then, following is established.

$$Xi=Lih*\sin \alpha$$

Also, a distance between the intersection SY and the horizontal plane is defined as Y0. Then, following is established.

$$Yi=Y0+Lih*\cos \alpha*\tan \beta$$

Also, with a linear expression of the light beam irradiation point, following is established.

$$yi+h/2=ysc0+a0*(xi+w/2)$$

Here, following is established in case where x1=0.

$$y0=ysc0+(a0*w+h)/2$$

The length of a light beam from the light beam irradiation point S to the intersection SY is defined as follows.

$$Li=Lih*\sqrt{\{1+(\cos \alpha*\tan \beta)^2\}}$$

A distance from a focal point of the virtual imaging plane is defined as Hi.

Then, following is established.

$$H0=Hi-Lih*\cos \alpha$$

A distance from the detection apparatus mounting base plane BP to the intersection SY can be defined as follows.

$$L0=L-Li$$

On the other hand, adapting "distance $L=10^{f(xi)}$", following is obtained.

$$L0=10^{f(0)}$$

The angle α and the angle β can be obtained using the image actually imaged. Following shows how to obtain these angles. As shown in FIG. 3B, to measure the angle α, a scale straight line part with graduations is placed on the objective photographed plane 4 which is orthogonal to the light beam in parallel with the x-axis. Then, the objective photographed plane is moved in parallel by a distance ΔLi from the detection apparatus mounting base plane BP.

Through the movement of the objective photographed plane, variation amount of scale reading value is obtained, which is defined as Δmx (X=0). Then, as shown in FIG. 3c, following is established.

$$\tan \alpha=(\Delta mx/\Delta Li)/f\beta,$$

where $f\beta=\sqrt{\{1+(\cos \alpha*\tan \beta)^2\}}$, so that, in case where α=24° and β=1°, for example, fβ turns to 1.0001.

As above, when the value of β is small, following is established.

$$\tan \alpha=\Delta mx/\Delta Li$$

With reference to FIG. 3C, to measure the angle β, the scale is placed on the objective photographed plane in parallel with the y-axis. Then, the objective photographed plane is moved in parallel by the distance ΔLi, which is the same distance as moved when measuring the angle α as above. Then, variation amount of scale reading value is obtained, which is defined as $\Delta my$ (Y=0).

Then, following is established.

$$\tan \beta = \{\Delta my/(\Delta Li^* \cos \alpha)\}/f\beta$$

When the value of $\beta$ is small, following is established.

$$\tan \beta = \Delta my/(\Delta Li^* \cos \alpha)$$

To fix the light beam irradiation point in the virtual imaging space of the imaging camera, the height H0 of the intersection SY and the focal distance f of the camera need to be identified. The height H0 of the intersection SY and the focal distance f of the camera are analyzed using the image actually imaged of the light beam irradiation point which is divided into M pieces at equal intervals. The coordinates of the light beam irradiation point (xi, yi) on the imaging plane 2a is read from the imaged image. The distance L0, which is the distance from the detection apparatus mounting base plane BP to the intersection SY, is already obtained as above. Therefore, followings are defined.

$$Li = L - L0$$

$$Lih = Li/f\beta$$

$$Xi = Lih^* \sin \alpha$$

$$Hi = H0 + Lih^* \cos \alpha$$

As mentioned above, the imaging space (quadrangular pyramid) of the imaging plane 2a and the virtual imaging space of the virtual imaging plane 2b are in similarity relation so that following is derived.

$$xi/f = Xi/Hi$$

Based on this, square residual $(Xi/Hi - xi/f)^2$ is obtained for each light beam irradiation point. Provided that there are M pieces of the irradiation points, square root of the average sum is defined as follows.

$$O(Hi,f) = \sqrt{\{\Sigma(Xi/Hi - xi/f)^2\}/M} \ (i=1 \text{ to } M)$$

Calculating the 0(Hi, f) to determine minimum Hi (that is, H0), the height H0 of the intersection SY and the focal distance f of the camera can be identified. Calculating up to about 4 significant digits of the height H0 of the intersection SY and the focal distance f of the camera allow to obtain sufficient accuracy. Note that if the focal distance f of the camera is known by a specification of the imaging camera, by simply calculating the height H0 of the intersection SY, the height H0 of the intersection SY and the focal distance f of the camera can be identified.

Based on x-direction component, y-direction component and z-direction component of the light beam length Li, the light beam irradiation direction vector nb can respectively be defined as follows: $Lih^* \sin \alpha$; $Lih^* \cos \alpha^* \tan \beta$; and $Lih^* \cos \alpha$.

When expressed in a unit vector, this is expressed as follows.

$$nb(\sin \alpha/f\beta, \cos \alpha^* \tan \beta/f\beta, \cos \alpha/f\beta)$$

A normal direction vector of the objective photographed plane 4 which is orthogonal to the light beam is nb. In an orthogonal coordinate system where a focal point is defined as z=0, and having x-axis and y-axis on the virtual imaging plane 2b, a plane including the light beam irradiation point S on the objective photographed plane is defined by the following expression.

$$nbX(X-Xi) + nbY(Y-Yi) + nbZ(Z-Hi) = 0,$$

where $nbX = \sin \alpha/f\beta$, $nbY = \cos \alpha^* \tan \beta/f\beta$, and $nbZ = \cos \alpha/f\beta$ By obtaining an intersection P, which is the intersection of a straight line op including a point p (xp, yp) on the imaging plane 2a and the objective photographed plane 4, a position on the objective photographed plane based on the position of the work object photographed on the imaging plane is determined. A direction vector of the straight line op is defined as follows.

$$op(xp/op, yp/op, f/op), \text{ where } op = \sqrt{(xp^2 + yp^2 + f^2)}.$$

An expression of the straight line op is as follows.

$$X/(xp/op) = Y/(yp/op) = Z/(f/op)$$

The expression is substituted into the expression for the plane including the light beam irradiation point S on the objective photographed plane as shown above, where $X = (xp/op)T$, $Y = (yp/op)T$, and $Z = (f/op)T$.

Then, following is obtained.

$$T = nb \cdot oS / nb \cdot op$$

Here, $nb \cdot oS$ and $nb \cdot op$ represent inner products of vectors, which are represented by components as follows.

$$nb \cdot oS = nbx^* Xi + nbY^* Yi + nbZ^* Hi$$

$$nb \cdot op = nbX^* xp/op + nbY^* yp/op + nbZ^* f/op$$

The point P on the objective photographed plane shows the center of figure of the projected work object. The light beam irradiation point S, which is visible, is set as the origin of the objective photographed plane. The coordinate axis on the objective photographed plane is optionally determined around the light beam. Due to these, it is practically convenient to choose an axial direction of the operation of the manipulator. Here, as default (initial) setting, X-axis and Y-axis of the virtual photographed face of the imaging camera are used to determine Xn-axis and Yn-axis of the photographed plane.

$$Xn = Y \times Xnb$$

$$Yn = nb \times X$$

Here, × represents outer product of vectors, which is represented by component as follows.

$$Xn = (nbZ/SX, O, -nbX/SX)$$

$$Yn = (O, nbZ/SY, -nbY/SY)$$

where $SX = \sqrt{(nbZ^2 + nbx^2)}$ and $SY = \sqrt{(nbZ^2 + nbY^2)}$.

A vector of a straight line SP connecting a point S (Xs, Ys, Zs) on the objective photographed plane and a point P (Xp, Yp, Zp) is defined as SP (Xp-Xs, Yp-Ys, Zp-Zs). Then, each coordinate axis component is represented by an inner product of SP, each coordinate axis vector Xn and Yn, and nb. The component of the Xn-axis is defined as follows.

$$SP \cdot Xn = (Xp - Xs) \cdot nbZ/SX - (Zp - Zs) \cdot nbX/SX$$

The component of the Yn-axis is defined as follows.

$$SP \cdot Yn = (Yp - Ys) \cdot nbZ/SY - (Zp - Zs) \cdot nbY/SY$$

The component of the Zn-axis is defined as follows.

$$SP \cdot nb = 0$$

This is because the vector SP is orthogonal to the vector nb.

The photographed plane is not always orthogonal to the light beam. As shown in FIG. 4, where a normal direction vector of the objective photographed plane is nr(nrX, nrY, nrZ), an expression for a plane representing a reference photographed plane 4a including the light beam irradiation point S is defined as follows.

$$nrX(X-Xi)+nrY(Y-Yi)+nrZ(Z-Hi)=0,$$

Where a point on the imaging plane 2a is q(xq, yq, zq) and a point on the virtual imaging plane 2b is Q, following is defined.

$$Tr=nr\cdot oQ/nr\cdot oq$$

$$Xq=(xq/oq)Tr$$

$$Yq=(yq/oq)Tr$$

$$Zq=(f/oq)Tr$$

A linear vector SQ connects the point S and the point Q on the reference photographed plane 4a. It is convenient for the operation of the manipulator to represent the linear vector SQ by the component of the coordinate axis Xn, Yn, and Zn of the orthogonal plane of the light beam. The each coordinate axis component is represented by an inner product of SQ, each coordinate axis vector Xn and Yn, and nb. The component of the Xn-axis is defined as follows.

$$SQ\cdot Xn=(Xq-Xs)\cdot nbZ/SX-(Zq-Zs)\cdot nbX/SX$$

The component of the Yn-axis is defined as follows.

$$SQ\cdot Yn=(Yq-Ys)\cdot nbZ/SY-(Zq-Zs)\cdot nbY/SY$$

The component of the Zn-axis is defined as follows.

$$SQ\cdot nb=(xq-xs)\cdot nbX+(Yq-Ys)\cdot nbY+(Zq-Zs)\cdot nbZ$$

Here, the reference photographed plane 4a is taken as the virtual imaging plane 2b. This provides a front image, having a distance from the focal point Hi, as the imaged image. Therefore, it is possible to comprise imaging camera-based detection apparatus, in which the imaging plane of the imaging camera is provided in parallel with the mounting base plane of the manipulator, and in which the light beam irradiation is directed to form the angle with the optical axis of the imaging camera.

A procedure and a method for obtaining a direction (normal direction) of the objective photographed plane using the three-dimensional position detection apparatus and the manipulator will be described. The procedure and the method are comprising:

(1) instructing to detect, by the robot controller, a distance from a current position to the objective photographed plane;

(2) returning a distance L0 from the computing device 6 to the robot controller, the distance L0 being the distance from the current position to the objective photographed plane;

(3) instructing, by the robot controller, a robot to perform an operation to move by X01 in x direction and then, instructing, by the robot controller, to detect a distance from the robot location at that time to the objective photographed plane;

(4) returning a distance L01 from the computing device 6 to the robot controller;

(5) instructing, by the robot controller, the robot to perform an operation to move by −X01 in x direction and to perform an operation to move by Y01 in y direction, and thereafter, instructing to detect distances to the objective photographed plane at that time; and (6) returning a distance L02 from the computing device 6 to the robot controller. Through above, inclinations in x operation direction and y operation direction are computed by the computing device of the controller. Then, the incli-nation of (L01−L00)/X01 in the x operation direction and (L02−l00)/Y01 in the y operation direction are obtained. Operating the detection apparatus mounting base plane of the manipulator so as to eliminate such inclinations allows to obtain a posture which is in parallel with the objective photographed plane. Also, in one embodiment, the detection accuracy of the inclination of the detection apparatus is smaller than 1/100.

A procedure and a method for registering the robot operation direction in the detection apparatus will be described. The procedure and the method are comprising:

(1) placing an object such as a disc on the objective photographed plane and adjusting the mounting base plane of the detection apparatus so as to obtain a posture which is in parallel with the objective photographed plane;

(2) storing center of figure (x00, y00) of the imaged image of the object in the detection apparatus;

(3) moving the object by X02 in x robot operation direction; and (4) storing center of figure (x01, y01) in the detection apparatus.

Through above, X robot operation direction vector (x01−x00, y01−y00) is obtained. A +Z direction, adapted to a robot coordinate system, is set as a front side. Then, a direction rotated by 90° in a counterclockwise direction therefrom is the Y robot operation direction. Here, note that, Y direction and Z direction are often opposite to each other in the robot coordinate system and the imaging camera coordinate system, to which attention should be paid.

A method for extracting work object from the imaged image to create profile and profile data will be described. The imaging plane comprises pixels in horizontal (xsc-axis) direction and in vertical (ysc-axis) direction. The size is represented, for example, as (800×600). Three primary colors of light (red, green blue) of color image have respective luminance values. In this embodiment, however, black-and-white luminance value (gray scale) is used. Then, selecting three pixels in a row in a horizontal direction, and comparing the luminance difference between a rightmost pixel and a leftmost pixel in the 3 pixels. If the difference obtained from the 3 pixels is over a threshold value Br, the 3 pixels are determined to be luminance difference element. Similarly, among three pixels in a row in a vertical direction, searching those with the luminance difference between an upper most pixel and a lower most pixel in the 3 pixels is over the threshold value Br. The 3 pixels determined to have the luminance difference over the threshold value Br are determined to be luminance difference element. Then, luminance difference elements are stored with the coordinates of the imaging plane.

A part of the imaged image of the work object is cut off into rectangle. The horizontal luminance difference element is searched sequentially in the vertical direction and searched for every three pixel in the horizontal direction. Also, the horizontal luminance difference element is searched sequentially in the horizontal direction and searched for every three pixel in the vertical direction. As for the luminance difference element as found through the search, the coordinate value thereof is respectively stored. The total number of elements Ne is stored as a profile of the object. Here, there are some reasons for using the luminance difference between both edges of the three pixels. One is that the same luminance difference between both edges of the three pixels includes more number of elements than the neighboring pixels, which makes it easy to capture objects.

The other is that performing the search for every three pixel increases the search speed 1.5 times as compared to performing the search for every two pixel.

Note that, in one embodiment, the luminance difference threshold value Br has an inverse relationship with the total number of elements Ne when the threshold value is from 16 to 40. The number of elements, however, acceleratingly decreases for the threshold value of over 50. The higher threshold value captures a feature of the imaged image, however, it does not represent the entire imaged image. It is desired that the threshold value as profile represents the entire image and has less number of elements. Table 1 shows one embodiment.

TABLE 1

| Br      | 16     | 24     | 32     | 40     | 50     | 64     | 80    |
|---------|--------|--------|--------|--------|--------|--------|-------|
| Ne      | 2,168  | 1,591  | 1,195  | 902    | 583    | 271    | 78    |
| Br * Ne | 34,688 | 38,184 | 38,240 | 36,080 | 29,150 | 17,344 | 6,240 |

The horizontal coordinate (xsci) and the vertical coordinate (ysci) of the element are respectively added at the same time when the luminance difference element is searched. Based on the total number of elements Ne at the end of the search, following is obtained.

$xscc = \Sigma xsci/Ne$ ($i=1$ to $Ne$)

$yscc = \Sigma ysci/Ne$ ($i=1$ to $Ne$)

The profile of the imaged image is generated as follows.

First, periphery of the center of figure is divided into J pieces at equal angle. Then, in accordance with relative coordinates (xai, yai) from the center of figure, the luminance difference element is arranged to the corresponding angle zone as divided. Thereafter, total number of the elements N$\theta$J and average radius r$\theta$j are computed for every zone represented by angle zone number $\theta$. These are represented by following expressions.

$xai = xsci - xscc$ $yai = ysci - yscc$ $\theta = f\theta(xai, yai)$ $sumr\theta j = \Sigma(xai^2 + yai^2)$ ($i=1$ to $N\theta j, \theta=j$)

$r\theta j = \sqrt{(sum\theta j/N\theta j)}$

Here, to reduce computing time, at the coordinates (xai, yai), a template in which angle zone number $\theta$ is previously described is provided for reading an angle $\theta$. Therefore, f$\theta$(xai, yai) is obtained by reading the angle $\theta$ at (xai, yai).

The average radius r$\theta$j represents a shape correctly. To feature as a profile data r$\theta$pj, square root of sum r$\theta$j, which is a sum of squares in the angle zone, is divided by its total sum, $\Sigma\sqrt{sumr\theta}$ to unitize (total sum of data is 1) to represent the obtained result by percent (%). The above is represented by the following expression.

$r\theta pj = \{\sqrt{sumr\theta j}/(\Sigma\sqrt{sumr\theta j})\}*100$ ($j=1$ to $J$)

Hereinafter, the above featuring will be explained. For the same object, the profile data is set as r$\theta$p and r$\theta$pj. In this case, the total sum of the absolute difference between r$\theta$p and the basic (registered) profile data, and the total sum of the absolute difference between r$\theta$pj and the basic (registered) profile data are obtained. When the respective best values are compared, the total sum of the absolute difference in case of r$\theta$p was 20% or more, and in case of r$\theta$pj, it was around 10%. It is possible that the total sum of the absolute difference with the profile data of an optional image is 20% or more. By setting the profile data as r$\theta$pj, identification determination of the object is achieved.

The total sum of the absolute difference sometimes becomes large (deteriorated) between the profile data r$\theta$pj, for which the work object is imaged alone, and the profile data, for which the work object is imaged with some background image. In this case, it is sometimes difficult to determine whether the profile data is: 1) the data for which the work object is imaged or 2) the profile data for which non-object area is imaged.

In this embodiment, however, the type of data can be determined by using the average absolute difference between each element radius r$\theta$ji of the same angle zone and an average radius r$\theta$mj to compute distribution value $\Delta$r$\theta$j of the element radius. By obtaining the distribution value $\Delta$r$\theta$j, it is possible to determine whether the value approximates (or derives from) the distribution value of the object imaged alone. Accordingly, the distribution value $\Delta$r$\theta$j is added to the profile data, which is expressed as follows.

$r\theta ji = \sqrt{(xai^2 + yai^2)}$ ($\theta=j$)

$r\theta mj = (\Sigma r\theta ji)/N\theta j$ ($i=1$ to $N\theta j$)

$\Delta r\theta j = (\Sigma|r\theta ji - r\theta mj|)/r\theta mj/N\theta j$ ($i=1$ to $N\theta j$)

Figure 5:
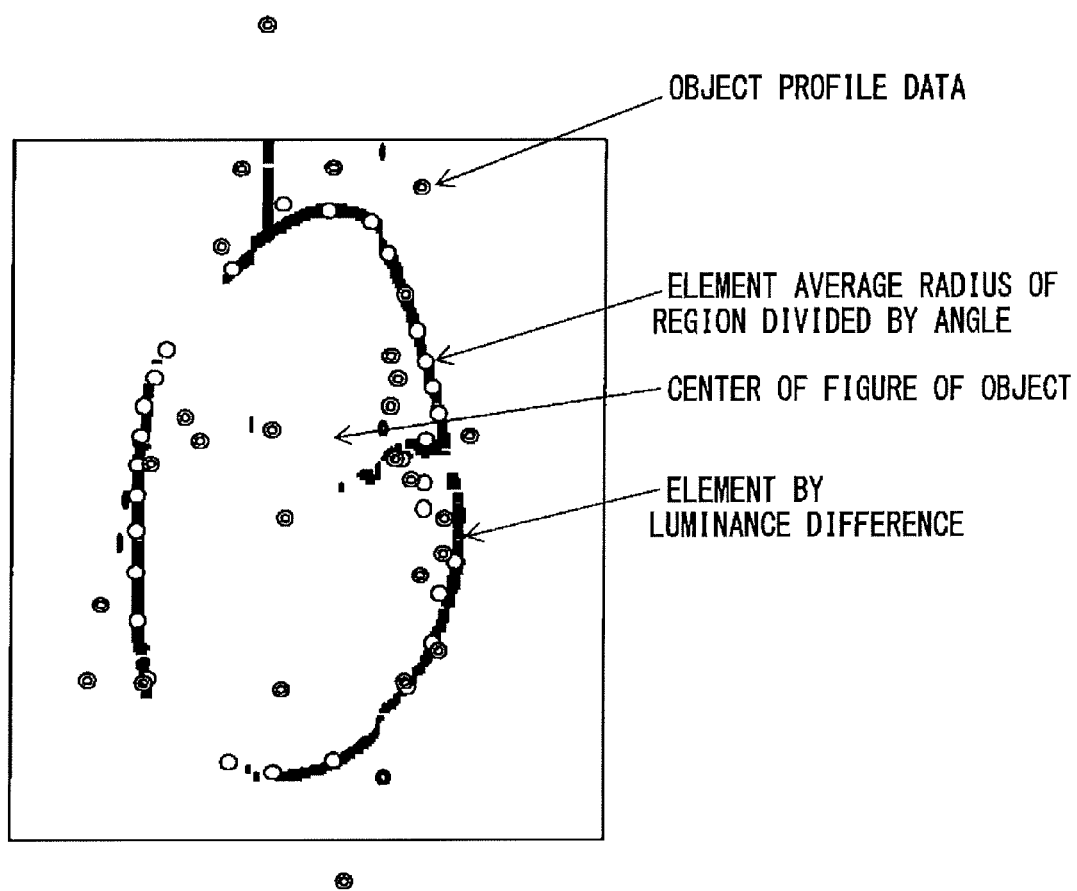
FIG. 5 is a diagram showing an example of profile data of work object generated from imaged image using image processing devised by the present invention.

If the profile data r$\theta$pj shows large deterioration, by comparing the value of $\Delta$r$\theta$j with the reference value, it is possible to determine that it is the work object only when a part of the angle zone differs. Actually, in an optional image, even when the profile data r$\theta$pj approximates, $\Delta$r$\theta$j largely differs. FIG. 5 illustrates an embodiment of the profile data r$\theta$pj. The horizontal luminance difference element is represented by "–".

The vertical luminance difference element is represented by "|". They represent a contour of the object. A center of figure is represented by "+". The periphery of the center of figure is divided into 36 pieces, which is represented by "o", representing the average radius r$\theta$j. The average radius r$\theta$j is on the contour and correctly represents a shape. The profile data r$\theta$pj is represented by double circles. It is obvious that the profile data r$\theta$pj forms a characteristic shape. In this example, a part of the contour is missing. Therefore, to capture the whole object, it is necessary to reduce the threshold of the luminance difference while increasing the number of the luminance difference elements. Followings show the profile of this example.

Distance: 143 mm
Luminance difference: 48
Number of luminance difference elements: 772
Element width: 93 pixels
Element height: 253 pixels To find the work object from the entire image screen, based on the size and shape of the object, it is determined whether the object is the work object or not. Here, the size of the object relates to a distance of the object. The shape of the object relates to the number of elements which is related to the luminance difference threshold value. In the present embodiment, distance is instantly found based on the imaged image as described above. Accordingly, the object can easily be found by registering profile data and profile relating to the distance and comparing them with data extracted from a search unit which is a part of the imaged image.

Figure 6:
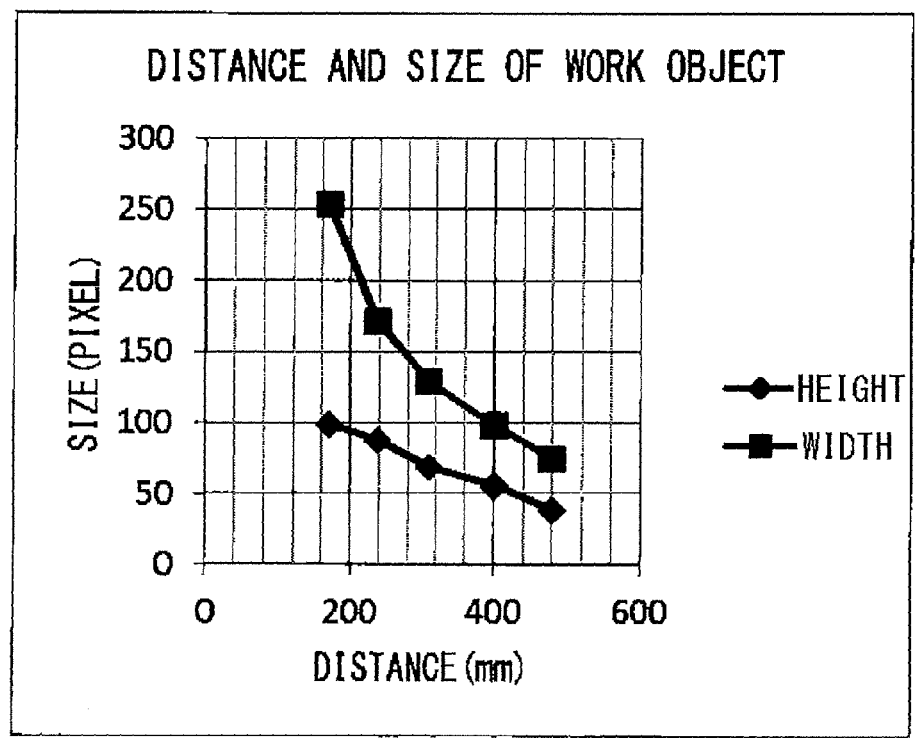
FIG. 6 shows distance, element width and element height of registration profile.
Figure 7:
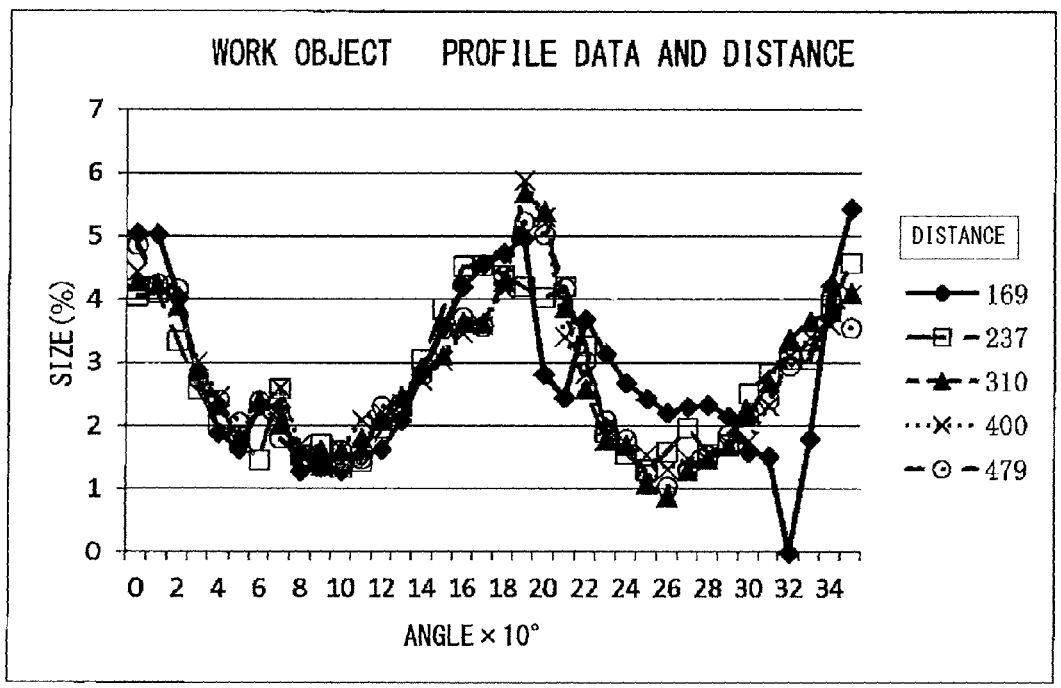
FIG. 7 shows relation between registration profile data and distance.

As an embodiment, table 2 shows object distance, luminance difference (LD), and the number of elements. FIG. 6 shows distance and size. FIG. 7 shows distance and profile data rθpj. Once the distance of the work object is detected, longitudinal and lateral sizes of an approximate distance is selected from FIG. 6. Distance interpolation or extrapolation is performed to compute the size of the object to thereby determine the size of the imaged image. Note that the direction of the object is unknown, so that compared with the height and the width, that which is larger is defined as the size of the object.

TABLE 2

| Object Distance (mm) | Luminance Difference | Number of Elements |
|---|---|---|
| 169 | 56 | 1,142 |
| 237 | 64 | 898 |
| 310 | 64 | 1,001 |
| 400 | 64 | 643 |
| 479 | 72 | 452 |

Now, referring to profile data as shown in FIG. 7, which is used as a basis for comparison, the total sum of the absolute difference from distance 237 to distance 479 is less than a several percent (%), regardless of the distance. A part of a profile data of distance 169 is missing and the shape thereof is slightly different from that of the other distances and there is a room for improvement. The total sum of the absolute difference, however, is about 10 percent (%), which is effective as a registration data. Note that the profile data as shown in FIG. 5 has nothing to do with that as shown in FIG. 7. Also, the size in FIG. 7 shows the value of the profile data rθpj.

Here, a procedure and a method for searching the object from the image of the entire image screen will be described.

The procedure and the method comprise: (1) registering the object; (2) detecting distance L from the imaged image to the objective photographed plane; (3) selecting registration data rθpjT of close distance; (4) determining size of the search unit; (5) setting the number of search luminance value elements, for example, the number is set as 0.85 to 1.2 times of the number of the registered elements; (6) arranging the search unit in the entire image screen; (7) calculating the number of luminance difference elements in the search unit; (8) if the number of luminance difference elements is within the set number of elements, creating profile data rθpjS; (9) calculating phase that minimizes total sum of the absolute difference $\Sigma|r\theta pjS-r\theta pjT|$; (10) aligning the search unit in an ascending order of the total sum of the absolute difference; (11) determining as the search object if, for example, the minimum total sum of the absolute difference is less than 20%; and (12) if the minimum total sum of the absolute difference is larger than 20%, calculating the distribution value of the profile data $\Delta r\theta jS$ to determine true or false.

Figure 8:
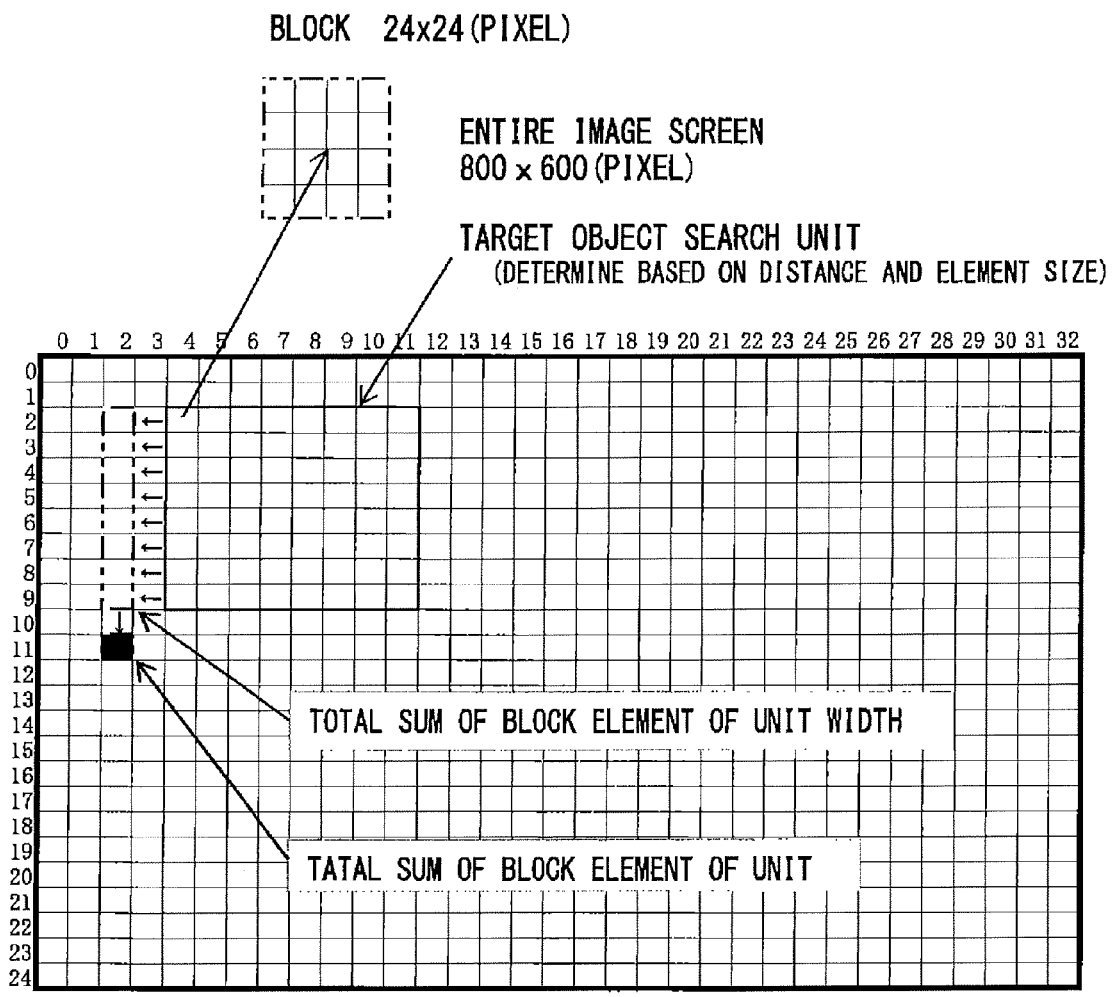
FIG. 8 is a diagram explaining that speeding up operation is achieved by partitioning imaging screen into blocks and by searching object for every object search unit.

To allow the detection apparatus to operate in real time, how to arrange the search unit in the image screen for rapid search will be important. FIG. 8 shows one method for this. In this example, full screen 800×600 pixel is divided into blocks of 24×24 pixels. Here, block position is defined as (bw, bh). Block number is defined as k and characteristic value of the block is defined as B×k. The characteristic value is, for example, the number of the luminance difference elements. The horizontal direction is divided into 33 blocks, which is represented as follows.

$$k=33bh+bw$$

The number of blocks in horizontal and the vertical parts of the search unit is defined as Mb. Then, the total sum in the horizontal part, sumWB×k is expressed as follows.

sum$WB \times K = \Sigma B \times k$ ($k=k$ to $k+Mb-1$)

The sum of the characteristic value of the search unit sumB×K is, since the vertical part is defined as k, k+33, k+33×2, ..., k+33(Mb−1), expressed as follows.

sum$B \times k = \Sigma$sum$WB \times n$ ($m=0$ to $Mb-1$, $n=k+33m$)

The above method enables sequential computation by adding and subtracting adjacent characteristic values to the already-calculated value, allowing performing high speed arithmetic operation. Details will be described as follows. In the horizontal part of the search unit, sumWB×K is expressed as sumWB×(k).

Then, the right adjacent part is expressed as follows.

sum$WB \times (k+1) =$ sum$WB \times (k) + B \times (k+Mb) - B \times (k)$.

By sequentially computing the right adjacent part, entire horizontal part is calculated. The same applies to calculate lower horizontal part. Then, the total sum of the horizontal part of all lines, sumWB×(k), is calculated. In the vertical part of the search unit, sumB×k is expressed as sumB×(k). A directly below part is expressed as follows.

sum$B \times (k+33) =$ sum$B \times (k) +$ sum$WB \times (k+33\ Mb) -$ sum$WB \times (k)$.

By sequentially computing the directly below part, entire vertical part is calculated. The same applies to the calculation of the right adjacent vertical part. Then, the total sum of the vertical part of all lines, sumB×(k) is calculated.

By creating the registered profile data, rectangular region and its center of figure which should be paid attention in the imaged image can be set. By calculating the total sum of the absolute difference of the registered profile data and the imaged image profile data $\Sigma|R\theta pjS-R\theta pjT|$, events occurring in the region can be monitored. The calculated total sum of the absolute difference represents value of the work progress. Alternatively, by giving a value for a final shape, it can detect completion of the work. Accordingly, it becomes possible to improve management of robot work quality including monitoring robot work progress and determining whether a posture of the object before work is good or not.

Here, the profile data Rθpj is replaced with the featured rθpj and the average radius rθj, which correctly represents the shape, is used. The profile data of fixed region is defined as Rθpj. Then, following is defined.

$R\theta pj = r\theta j$

Figure 10:
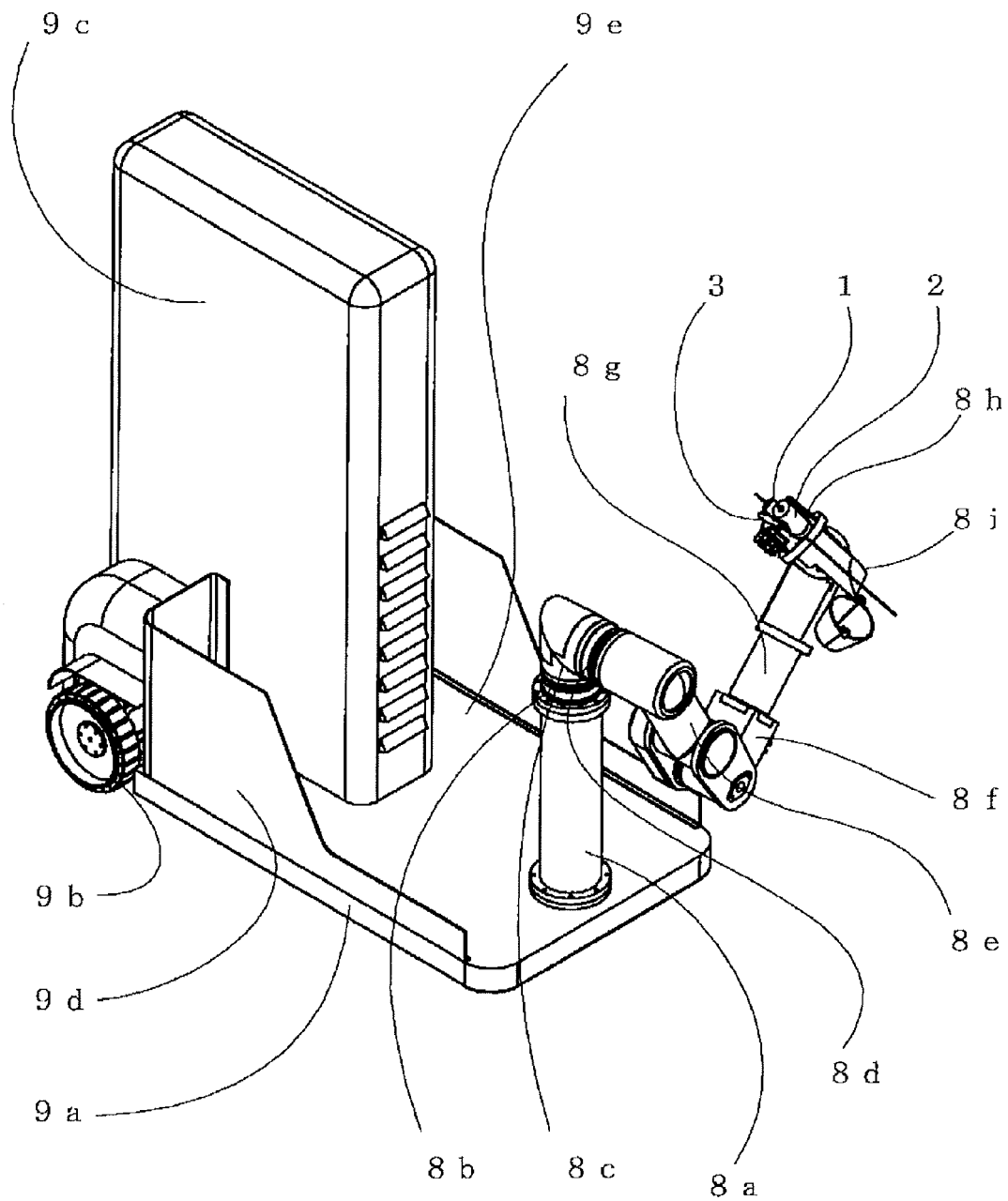
FIG. 10 shows a perspective view of work robot as an embodiment, which comprises detection apparatus of the present invention at the end of an arm of movable type arm robot.
Figure 11:
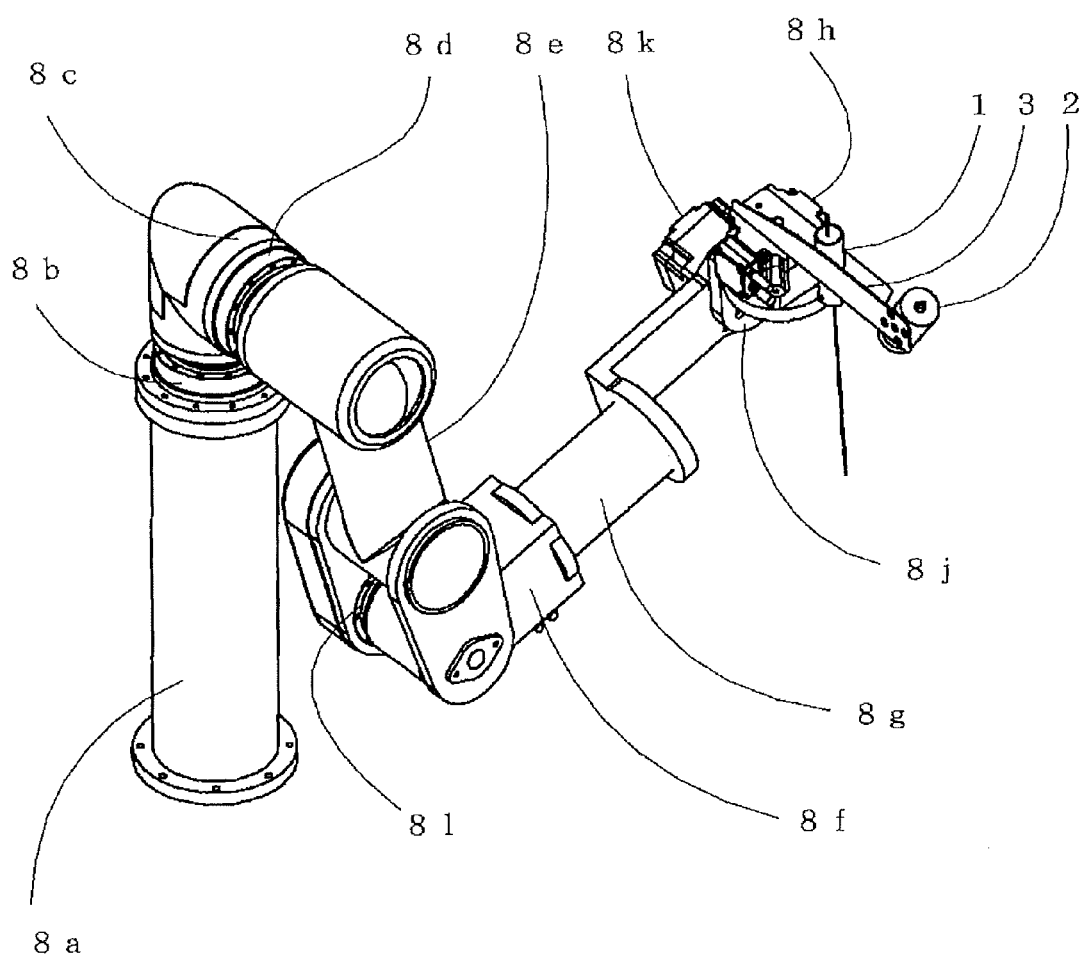
FIG. 11 shows a perspective view of work robot as an embodiment, in which the arm robot part is taken out and the detection apparatus is attached.

The above mentioned method is adapted to a position detection sensor of driving mechanism of the end effector so that instruction to start or stop can be output to the driving mechanism. This enables a work in which equipment is used while visual confirmation is performed by a human. FIG. 10 and FIG. 11 illustrate an embodiment of the present invention. In FIG. 10, a perspective view of a movable arm robot, which comprises a three-dimensional position detection apparatus for detecting the three-dimensional position of object, is illustrated. In FIG. 11, a perspective view, in which the arm robot part is taken out, is illustrated.

The movable arm robot comprises the arm robot, which is provided at a front center of a movable carriage 9a and which comprises the three-dimensional position detection apparatus for detecting the three-dimensional position of object of the present invention. A drive wheel 9b, which independently rotates, is provided at rear right and left sides of the movable carriage. A flexible caster is provided at front lower right and left sides of the movable carriage so that the movable arm robot can move forward and backward in an optional two-dimensional direction. A cover 9c is provided at a rear center of the movable arm robot. The cover 9c is an equipment space, in which, battery which is a power source, robot controller, computing device for the detection apparatus in accordance with the present embodiment, LAN communication equipment or other controllers are stored. A place to store cargos, i.e., a cargo place 9e is provided at center, left and right of the movable carriage 9a. At the rear and both ends of the cargo place 9e, a carriage cover 9d is provided to prevent cargo collapse. The arm robot can pick up the object from ground or from both sides of the front of the movable carriage to store the picked up object in the cargo place.

The movable carriage is operated in two modes. One is a driving mode and the other is an approaching mode. Through the driving mode, sign or mark of the imaged image is detected and tracked. Through the approaching mode, when the object is outside the operation range of the arm robot, the arm robot approaches the object so as to bring the object within the operation range of the arm robot. To operate the movable carriage in both modes, the right and left drive wheels, which independently rotate, are controlled.

An odometer function is always provided on the movable carriage. Errors are accumulated for long distance driving so that it becomes necessary to check position at important points. The three-dimensional position detection apparatus for detecting the three-dimensional position of object can be adapted to check position.

The arm robot is a multi-articulated robot with six-axis, which are shoulder yaw-shoulder pitch-elbow pitch-wrist yaw-wrist pitch-wrist roll. The three axes of the wrist are orthogonal to one another. The three-dimensional position detection apparatus attempts to adjust the irradiation direction in any direction. This is enabled by adhering a mounting base plane of a frame 3 to a rear surface of a driving mechanism 8h of the wrist roll axis having five degrees of freedom, and then, arranging the wrist roll axis so as to be in parallel with the light beam irradiation direction. The arm is controlled by obtaining relative distance from the detected object to an action point of the end effector and data on a plane position and direction from the detection apparatus of the present invention.

The arm robot is comprised of a shoulder yaw driving mechanism 8b on a flange of an arm pedestal 8a; an L-shaped shoulder yaw body 8c at an output terminal of the shoulder yaw driving mechanism; a shoulder pitch driving mechanism 8d at the end of the shoulder yaw body; a fork-shaped shoulder pitch body 8e at an output terminal of the shoulder pitch driving mechanism; an elbow pitch driving mechanism 8l at one side of the fork of the shoulder pitch body; an elbow pitch body 8f at an output terminal of the elbow pitch driving mechanism; a wrist pitch driving mechanism in the elbow pitch body; an offset-shaped wrist yaw body 8g at an output terminal of the wrist pitch driving mechanism; a wrist pitch driving mechanism 8k at an end of the wrist yaw body; an L-shaped wrist pitch body 8j at an output terminal of the wrist pitch driving mechanism; a wrist roll driving mechanism 8h at one side of the wrist pitch body; and a hand (end effector) 8i at an output terminal of the wrist roll driving mechanism.

Also, in this embodiment, an electric motor of less than 80 W is used for a power of the entire driving mechanism including drive wheel, considering that robot coexists with a human.

The movable arm robot in accordance with the present embodiment is devised to harvest strawberry. The movable arm robot travels on a ridge to seek strawberries bearing right and left ridges based on the imaged images. Then, the three-dimensional position and direction of the strawberries as found are detected. An image data of the center of figure side is color histogram-analyzed by the luminance difference element of the detected object to determine degree of ripeness. Then, the three-dimensional position and direction are output to the robot controller. Using a fruit-thinning device of an end effector, the robot controller receives and thins strawberries. Then, the robot controller stores the strawberries in a cargo place. It is contemplated that, not limited to harvesting strawberries, the movable arm robot is used to harvest fruit trees.

While a conventional industrial robot is used in a fixed (set) operating environment, the movable arm robot works in accordance with an environment. It requires detecting work object, relative distance, positional relation and direction of the object in real time so that, in a conventional technology, large-scale equipment was inevitable. However, with the use of the detection apparatus according to the present invention, the equipment is significantly simplified.

INDUSTRIAL APPLICABILITY

The detection apparatus of the present invention does not replace with the processing of the imaged image conventionally used to the industrial robot. It, however, will be one solution to an uncertainty of end effector (detection of work error, monitoring work).

Monitoring a temporal change of profile data in which region and center of figure of an imaged image have been fixed enables to use the detection apparatus as a position sensor and control driving force equipped to the end effector. Also, using an equipment while performing visual confirmation by a human enables to ensure work quality.

The present invention is applicable to works for the movable arm robot which require large-scale equipment or environment-responsive works which were difficult to cope with in the conventional technology. Various applications are expected for this. For example, it is possible to configure such that wireless LAN is used in a dangerous area, a person remotely looks an image imaged at a free angle in real time, a target object in the image is specified by the person, and end effector is automatically acted on the target object.

This application claims the benefit of Japanese Patent Application No. 2014-094540, filed May 1, 2014, the entire disclosure of which is hereby incorporated by reference.

What is claimed is:
1. A detection apparatus, comprising:
a singular monocular imaging unit;
a single light beam irradiation unit provided at an end of a manipulator; and
a computing unit, wherein:
an optical axis of the imaging unit forms an intersecting angle with a light beam projected on a horizontal imaging plane or a light beam projected on a vertical imaging plane which passes through the optical axis of the imaging unit,
the computing unit is configured to compute a distance L between the light beam irradiation unit and an objective plane which is orthogonal to a light beam irradiation direction, by obtaining a position of a light beam irradiation point on the imaging plane of the objective plane from an image, which is imaged by the imaging unit, of a light beam irradiation point on the an objective plane defined on the object, the computing unit is further configured to obtain a corresponding distance L for the obtained position of the light beam irradiation point on the imaging plane with reference to a relational expression previously formed based on:
1) a position (xi, yi) (i=0, 1, 2, . . . N) of the light beam irradiation points on the imaging plane; and
2) an actually measured value of distances Li between the objective plane and light beam irradiation unit for respective position (xi, yi) of the light beam irradiation points on the imaging plane, and wherein the computing unit is further configured to obtain a relative distance between the light beam irradiation point and hand coordinate point, which is a coordinate of joint point to which the detection apparatus is mounted and is obtained based on kinematics of a robot, based on the obtained corresponding distance L.

2. The detection apparatus according to claim 1, wherein the computing unit obtains a relative distance between the light beam irradiation point and hand coordinate point, which is a coordinate of joint point to which the detection apparatus is provided and is obtained based on kinematics of the manipulator, based on the obtained corresponding distance L.

3. The detection apparatus according to claim 1, wherein the computing unit obtains the distance L corresponding to the obtained position of the light beam irradiation point on the imaging plane with reference to a polynomial logarithmic approximation $L=10^{f(x)}$ ($f(x)=\Sigma bn*xn(n=0$ to N)) or $L=10^{f(y)}$ ($f(y)=\Sigma cn*yn(n=0$ to N)), wherein x and y respectively represent x coordinate and y coordinate of the obtained position of the light beam irradiation point on the imaging plane.

4. The detection unit according to claim 1,
wherein a position on the objective plane having a normal is calculated by an expression expressing a plane defined by a light beam irradiation point S as an origin point and a direction of the normal,
wherein a point p on the imaging plane is projected onto the an objective plane as a point P,
wherein a coordinate of the position P on the an objective plane, with the light beam irradiation point S being an origin, is obtained by:
calculating an inner product of a vector SP and direction components Xn, Yn on the objective plane defined by a horizontal x axis and a vertical y axis of the imaging plane of the imaging unit; and
calculating an inner product of the vector SP and direction components on the objective plane defined by operation direction of the manipulator.

5. The detection unit according to claim 4, wherein a point q on the imaging plane is projected on a reference an objective plane having an arbitrary normal direction, wherein the computing unit obtains a position of a projection point Q, with the irradiation beam point S as origin, based on the direction component on the objective plane as defined by the operation direction of the manipulator and further based on result of computation of the inner product of vector SQ and the light beam irradiation direction component.

6. A method, comprising:
providing a singular monocular imaging unit;
providing a single a light beam irradiation unit at an end of a manipulator;
arranging the light beam irradiation unit and the imaging unit such that an optical axis of the imaging unit forms an intersecting angle with a light beam projected on a horizontal imaging plane or a light beam projected on a vertical imaging plane which passes through the optical axis of the imaging unit;

computing a distance L between the light beam irradiation unit and an objective plane which is orthogonal to a light beam irradiation direction, by obtaining a position of a light beam irradiation point on the imaging plane of the objective plane from an image, which is imaged by the imaging unit, of a light beam irradiation point on the objective plane defined on the object;

obtaining a corresponding distance L for the obtained position of the light beam irradiation point on the imaging plane with reference to a relational expression previously formed based on:
1) a position (xi, yi) (i=0, 1, 2, . . . N) of the light beam irradiation points on the imaging plane; and
2) an actually measured value of distances Li between the objective plane and light beam irradiation unit for respective position (xi, yi) of the light beam irradiation points on the imaging plane; and obtaining a relative distance between the light beam irradiation point and hand coordinate point, which is a coordinate of joint point to which the detection apparatus is mounted and is obtained based on kinematics of a robot, based on the obtained corresponding distance L.

7. The method of claim 6, wherein:
a position on the objective plane having a normal is calculated by an expression expressing a plane defined by a light beam irradiation point S as an origin point and a direction of the normal,
a point p on the imaging plane is projected onto the an objective plane as a point P,
a coordinate of the position P on the an objective plane, with the light beam irradiation point S being an origin, is obtained by:
calculating an inner product of a vector SP and direction components Xn, Yn on the objective plane defined by a horizontal x axis and a vertical y axis of the imaging plane of the imaging unit; and
calculating an inner product of the vector SP and direction components on the objective plane defined by operation direction of the manipulator,
a point q on the imaging plane is projected on a reference an objective plane having an arbitrary normal direction, and
the computing step includes obtaining a position of a projection point Q, with the irradiation beam point S as origin, based on the direction component on the objective plane as defined by the operation direction of the manipulator and further based on result of computation of the inner product of vector SQ and the light beam irradiation direction component.

8. The method of claim 7, further comprising obtaining a point on the image plane by:
restructuring a work object, which is projected on the objective plane or the reference objective plane, with elements extracted by luminance differences in a rectangular area of +the imaged image including the object;
defining a first profile data as a shape data having an angle and size or radius, the first data including a quotient obtained by dividing, for unitizing, a dividend by a divisor, the dividend being a square root of the sum of squares of radii of elements from a center of figure of luminance difference elements in a divided area, which is obtained by dividing a periphery of an element group into equal angles, and the divisor being the sum of squares of radii; and defining a profile based on a distance from the apparatus mounting reference plane when imaged to the light beam irradiation point, threshold of luminance difference, longitudinal and lateral sizes of luminance difference element group, position of center of figure, and number of luminance difference elements.

9. The method of claim 7, further comprising:
calculating a distance from an apparatus mounting reference surface to a light beam irradiation point;
selecting a profile and a first profile data of closest distance among the profiles of registered object based on the distance; determining a size of a search unit by performing distance interpolation or extrapolation of longitudinal and lateral size of a registered profile;
selecting a search unit having minimum total sum of absolute difference with the registered first profile data as selected among the first profile data generated in the search unit disposed on an entire image screen; and
specifying, by defining a center of the object as a center of figure of the luminance difference element group of the search unit, a point on the imaging plane, and determining the position of the center of the object having the light beam irradiation point as an origin, based on the direction component on the objective plane of the robot coordinate system and the light beam irradiation direction component.

10. The method of claim 7, further comprising operating, by a robot controller, a manipulator in real time, by:
outputting an instruction to set and search the work object from the robot controller through communication,
selecting the profile of the work object and the registered first profile data to detect the position of the work object from the imaged image according to the following steps:
 calculating a distance from an apparatus mounting reference surface to a light beam irradiation point;
 selecting a profile and a first profile data of closest distance among the profiles of registered object based on the distance; determining a size of a search unit by performing distance interpolation or extrapolation of longitudinal and lateral size of a registered profile; selecting a search unit having minimum total sum of absolute difference with the registered first profile data as selected among the first profile data generated in the search unit disposed on an entire image screen; and
 specifying, by defining a center of the object as a center of figure of the luminance difference element group of the search unit, a point on the imaging plane, and determining the position of the center of the object having the light beam irradiation point as an origin, based on the direction component on the objective plane of the robot coordinate system and the light beam irradiation direction component; and
returning a distance from the apparatus mounting reference surface to the work object, a position on the objective plane and a direction of the object to the robot controller.

11. The method of claim 6, further comprising
detecting difference between the object in the imaged image and the registered object,
calculating total sum of absolute difference with the area-fixed profile data generated by the imaged image and the area-fixed profile data as registered to digitalize changes in the rectangular area, which is realized by fixing the rectangular area which extracts the luminance difference element used for generating the registered profile data of the work object, and
fixing center of figure of the registered profile as center of figure of the luminance difference element extracted from the imaged image, and detecting matters relating to determine whether work quality is acceptable or not, the work quality including work quality condition before the work, progress of the work, end of the work, and existence or non-existing of a work failure by:
restructuring a work object, which is projected on the objective plane or the reference objective plane, with elements extracted by luminance differences in a rectangular area of +the imaged image including the object;
defining a first profile data as a shape data having an angle and size or radius, the first data including a quotient obtained by dividing, for unitizing, a dividend by a divisor, the dividend being a square root of the sum of squares of radii of elements from a center of figure of luminance difference elements in a divided area, which is obtained by dividing a periphery of an element group into equal angles, and the divisor being the sum of squares of radii; and
defining a profile based on a distance from the apparatus mounting reference plane when imaged to the light beam irradiation point, threshold of luminance difference, longitudinal and lateral sizes of luminance difference element group, position of center of figure, and number of luminance difference elements.

12. The method of claim 11, wherein the total sum of absolute difference with the area-fixed profile data indicates amount of change of the object in the rectangular area, the method further comprising:
detecting a position to control driving force of an end effector by defining the amount of change of the object as amount of change of the position of the object, and
performing a work by a robot controller by controlling power.

* * * * *